United States Patent
Kim et al.

(10) Patent No.: US 10,623,144 B2
(45) Date of Patent: *Apr. 14, 2020

(54) DEVICE AND METHOD FOR COMMUNICATING CHANNEL STATE INFORMATION REFERENCE SIGNAL (CSI-RS) IN WIRELESS COMMUNICATION SYSTEM

(71) Applicant: Samsung Electronics Co., Ltd., Suwon-si, Gyeonggi-do (KR)

(72) Inventors: Youn Sun Kim, Seongnam-si (KR); Jin Kyu Han, Seoul (KR); Sung Tae Kim, Suwon-si (KR); Myung Hoon Yeon, Yongin-si (KR); Cheng Shan, Suwon-si (KR); In Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,546

(22) Filed: Nov. 5, 2018

(65) Prior Publication Data

US 2019/0074932 A1 Mar. 7, 2019

Related U.S. Application Data

(63) Continuation of application No. 15/790,695, filed on Oct. 23, 2017, now Pat. No. 10,122,497, which is a
(Continued)

(30) Foreign Application Priority Data

Jan. 12, 2010 (KR) .................. 10-2010-0002837
Feb. 11, 2010 (KR) .................. 10-2010-0013005

(51) Int. Cl.
*H04L 1/06* (2006.01)
*H04B 17/318* (2015.01)
(Continued)

(52) U.S. Cl.
CPC ......... *H04L 1/0693* (2013.01); *H04B 17/318* (2015.01); *H04L 1/0003* (2013.01);
(Continued)

(58) Field of Classification Search
CPC ..... H04L 47/10; H04L 5/0053; H04L 5/0023; H04L 5/0048; H04L 5/0035; H04L 1/00;
(Continued)

(56) References Cited

U.S. PATENT DOCUMENTS 7,099,346 B1 8/2006 Kanterakis
8,208,434 B2 6/2012 Sayana et al.
(Continued)

FOREIGN PATENT DOCUMENTS

CN 101071549 A 11/2007
CN 101436889 A 5/2009
(Continued)

OTHER PUBLICATIONS

3GPP TS 36.211 v.8.5.0, "Evolved Universal Terrestrial Radio Access (E-UTRA); Physical Channels and Modulation (Release 8)", 3GPP TS 36.211 v.8.5.0, Dec. 2008.
(Continued)

*Primary Examiner* — Benjamin H Elliott, IV
(74) *Attorney, Agent, or Firm* — Jefferson IP Law, LLP

(57) ABSTRACT

A method for wireless communication by a terminal, a method for wireless communication by a base station, the terminal, and the base station, are provided. The method for wireless communication by the terminal includes receiving first information comprising a muting subframe interval, a subframe offset, and a muting position of a resource element in a resource block, checking presence of a data in a subframe, determining the resource element to be muted in the subframe based on the muting subframe interval, the subframe offset, and the muting position, if the data is
(Continued)

present, and receiving the data on a physical downlink shared channel (PDSCH) based on the result of the determining step.

16 Claims, 30 Drawing Sheets

Related U.S. Application Data continuation of application No. 14/592,351, filed on Jan. 8, 2015, now Pat. No. 9,800,373, which is a continuation of application No. 14/154,770, filed on Jan. 14, 2014, now Pat. No. 9,077,519, which is a continuation of application No. 12/987,436, filed on Jan. 10, 2011, now Pat. No. 8,634,363.

(51) Int. Cl.

| | | |
|---|---|---|
| *H04L 1/00* | (2006.01) | |
| *H04L 5/00* | (2006.01) | |
| *H04L 25/02* | (2006.01) | |
| *H04W 72/04* | (2009.01) | |
| *H04W 72/08* | (2009.01) | |
| *H04B 17/24* | (2015.01) | |
| *H04W 72/12* | (2009.01) | |
| *H04L 25/03* | (2006.01) | |

(52) U.S. Cl.
CPC .......... *H04L 1/0009* (2013.01); *H04L 5/0023* (2013.01); *H04L 5/0035* (2013.01); *H04L 5/0048* (2013.01); *H04L 5/0053* (2013.01); *H04L 5/0057* (2013.01); *H04L 5/0073* (2013.01); *H04L 25/0226* (2013.01); *H04W 72/04* (2013.01); *H04W 72/042* (2013.01); *H04W 72/085* (2013.01); *H04B 17/24* (2015.01); *H04L 1/0026* (2013.01); *H04L 1/0027* (2013.01); *H04L 1/06* (2013.01); *H04L 5/0082* (2013.01); *H04L 5/0092* (2013.01); *H04L 2025/03426* (2013.01); *H04L 2025/03802* (2013.01); *H04W 72/1226* (2013.01); *Y02D 70/00* (2018.01); *Y02D 70/1262* (2018.01); *Y02D 70/1264* (2018.01); *Y02D 70/20* (2018.01)

(58) Field of Classification Search
CPC .. H04L 25/0226; H04W 72/04; H04W 88/08; H04W 76/00; H04W 72/0446; H04W 72/0466; H04W 72/1226
See application file for complete search history.

(56) References Cited

U.S. PATENT DOCUMENTS

| | | | |
|---|---|---|---|
| 8,634,363 | B2 | 1/2014 | Kim et al. |
| 9,077,519 | B2 | 7/2015 | Kim et al. |
| 9,800,373 | B2 | 10/2017 | Kim et al. |
| 10,122,497 | B2* | 11/2018 | Kim ................... H04L 5/0023 |
| 2007/0262974 | A1 | 11/2007 | Take |
| 2007/0297379 | A1 | 12/2007 | Gorokhov et al. |
| 2008/0095037 | A1 | 4/2008 | Chang et al. |
| 2010/0197302 | A1 | 8/2010 | Chen et al. |
| 2010/0254471 | A1 | 10/2010 | Ko et al. |
| 2010/0331030 | A1 | 12/2010 | Nory et al. |
| 2011/0080896 | A1 | 4/2011 | Krishnamurthy et al. |
| 2011/0170435 | A1 | 7/2011 | Kim et al. |
| 2011/0170496 | A1 | 7/2011 | Fong et al. |
| 2011/0237270 | A1 | 9/2011 | Noh et al. |
| 2011/0244877 | A1 | 10/2011 | Farajidana et al. |
| 2012/0020272 | A1 | 1/2012 | Lee et al. |
| 2012/0076106 | A1 | 3/2012 | Bhattad et al. |
| 2012/0099547 | A1 | 4/2012 | Wan et al. |
| 2012/0120842 | A1* | 5/2012 | Kim ................... H04B 7/024 370/252 |
| 2015/0124758 | A1 | 5/2015 | Kim et al. |
| 2019/0074932 | A1* | 3/2019 | Kim ................... H04L 5/0023 |

FOREIGN PATENT DOCUMENTS

| | | |
|---|---|---|
| JP | 2012-531858 A2 | 12/2012 |
| KR | 10-2009-0032628 A | 4/2009 |
| KR | 10-2009-0033245 A | 4/2009 |

OTHER PUBLICATIONS

R1-091950, "CSI-RS and DRS Design for LTE-A System", 3GPP TSG-RAN WG1 #57, May 4-8, 2009.
R1-091714, "DL Reference Signal Design for CSI Generation in LTE-Advanced", 3GPP TSG-RAN WG1 #57, May 4-8, 2009.
R1-093375, "Discussions on CSI-RS for LTE-Advanced", 3GPP TSG-RAN WG1 meeting #58, Aug. 24-28, 2009.
R1-094171, "Further Details on CSI-RS Design for LTE-Advanced", 3GPP TSG-RAN Working Group 1 Meeting #58bis, Oct. 12-16, 2009.
R1-094574 "Discussion on CSI-RS for L TE-Advanced"; 3GPP TSG RAN WG1 #59; Jeju, Korea, Nov. 9-13, 2009; Samsung.
R1-094647 "Intra-cell CSI-RS design aspects"; 3GPP TSG RAN WG1 #59; Jeju, Korea, Nov. 9-13, 2009; Nokia.
R1-094704 "Further design and evalutaion on CSI-RS for L TE-A"; 3GPP TSG RAN WG1 #59; Jeju, Korea, Nov. 9-13, 2009; Huawei.
R1-094728 CSI-RS design for L TE-Advanced; 3GPP TSG RAN WG1 #59; Jeju, Korea, Nov. 9-13, 2009; NEC.
R1-094762 "CSI Measurement with Downlink Reference Signal"; 3GPP TSG RAN WG1 #59; Jeju, Korea, Nov. 9-13, 2009; Texas Instruments.
R1-094850 "Cyclic Shift Multiplexing of CSI-RS"; 3GPP TSG RAN WG1 #59; Jeju, Korea, Nov. 9-13, 2009; Motorola.
R1-094867 "Details of CSI-RS"; 3GPP TSG RAN WG1 #59; Jeju, Korea, Nov. 9-13, 2009; Qualcomm.
R1-094907 "Multi-Cell CSI-RS Pattern and Sequence"; 3GPP TSG RAN WG1 #59; Jeju, Korea, Nov. 9-13, 2009; Woasis.
R1-094909 "Views on CSI-RS Design Issues for LTE-Advanced"; 3GPP TSG RAN WG1 #59; Jeju, Korea, Nov. 9-13, 2009; NTT DoCoMo.
R1-094942 "Multi-Cell CSI-RS design considerations"; 3GPP TSG RAN WG1 #59; Jeju, Korea, Nov. 9-13, 2009; Fujitsu.
Samsung, "DL RS Designs for Higher Order MIMO", 3GPP TSG RAN WG1 #56, R1-090619, Feb. 9-13, 2009, Athens, Greece.
NTT Docomo, "DL RS Design for LTE-Advanced", 3GPP TSG RAN WG1 Meeting #56bis, R1-091483, Mar. 23-27, 2009, Seoul, Korea.
Panasonic, "Downlink CSI-RS Design for Inter-Cell Scenarios", 3GPP TSG RAN WG1 Meeting #58, R1-093457, Aug. 24-29, 2009, Shenzhen, China.
Alcatel-Lucent Shanghai Bell, Alcatel-Lucent, "Multi-Cell Cooperative RS in CoMP", 3GPP TSG-RAN WG1 #58, R1-093341, Aug. 24-28, 2009, Shenzhen, China.
CATT, "Important Issues Concerning CSI-RS for both FDD and TDD", 3GPP TSG RAN WG1 Meeting #59, R1-094547, Nov. 9-13, 2009, Jeju, Korea.
Panasonic, "Inter-Cell CSI-RS Design", 3GPP TSG RAN WG1 Meeting #59, R1-094506, Nov. 9-13, 2009, Jeju, Korea.
Nokia et al: "Multi-cell CSI-RS transmission and related impact to LTE Rel '8", 3GPP Draft; R1-094649, 3rd Generation Partnership Project(3GPP), Mobile Competence Centre; 650, Route Des Lucioles; F-06921 Sophia-Antipolis Cedex; France, No. Jeju; Nov. 9, 2009, Nov. 9, 2009, XP050389054.
Nokia et al: "Multi-cell CSI-RS design aspects", 3GPP Draft; R1-093909, Multi-Cell CSI-RS Design Aspects, 3rd Generation Partnership Project(3GPP), Mobile Competence Centre; 650, Route Des Lucioles; F-06921 Sophia-Antipolis Cedex; France, No. Miyazaki; Oct. 12, 2009, Oct. 12, 2009, XP050388411.
Nokia et al: "Inter-cell CSI-RS design and performance", 3GPP Draft; R1-094648, 3rd Generation Partnership Project(3GPP), Mobile

(56) References Cited

OTHER PUBLICATIONS

Competence Centre; 650, Route Des Lucioles; F-06921 Sophia-Antipolis Cedex; France, No. Jeju; Nov. 9, 2009, 9 Nov. 9, 2009, XP050389053.

NEC Group: "CQI-RS for LTE-Advanced", 3GPP Draft; R1-091221-CQI-RS, 3rd Generation Partnership Project(3GPP), Mobile Competence Centre; 650, Route Des Lucioles; F-06921 Sophia-Antipolis Cedex; France, No. Seoul, Korea; Mar. 19, 2009, Mar. 19, 2009, XP050338836.

LG Electronics, "Finalizing specification for RE muting", 3GPP TSG-RA WG1#63, Jacksonville USA, Nov. 15-19, 2010, R1-106440.

Huawei, HiSilicon, "Remaining details on CSI RS", 3GPP TSG-RAN WG1#63, Jacksonville USA, Nov. 15-19, 2010, R1-105840.

LG Electronics, "Muting aspects and Intercell CSI-RS design", 3GPP TSG-RAN WG1#61, Montreal, Canada, May 10-14, 2010, R1-102698.

NEC Group, CSI-RS design for LTE-Advanced, 3GPP TSG-RAN WG1#58b R1-093589, Oct. 5, 2009.

NTT Docomo, DL CSI-RS Design for LTE-Advanced, 3GPP TSG-RAN WG1#58b R1-094240, Oct. 6, 2009.

Chinese Office Action dated Oct. 27, 2017, issued in the Chinese Application No. 201510412848.X.

\* cited by examiner

FIG. 6
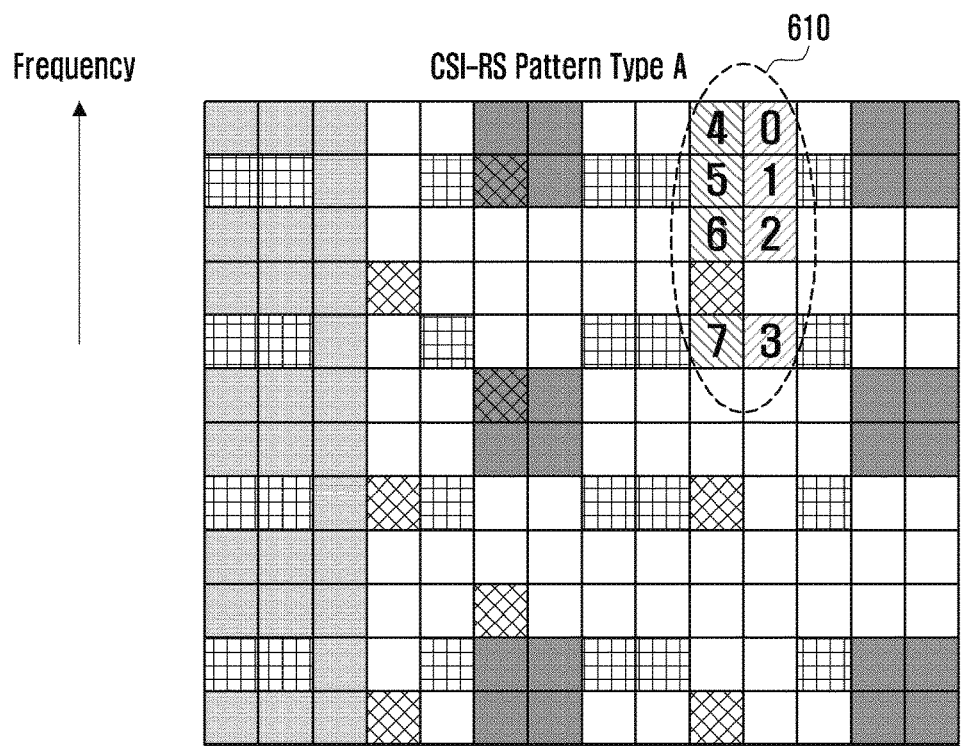
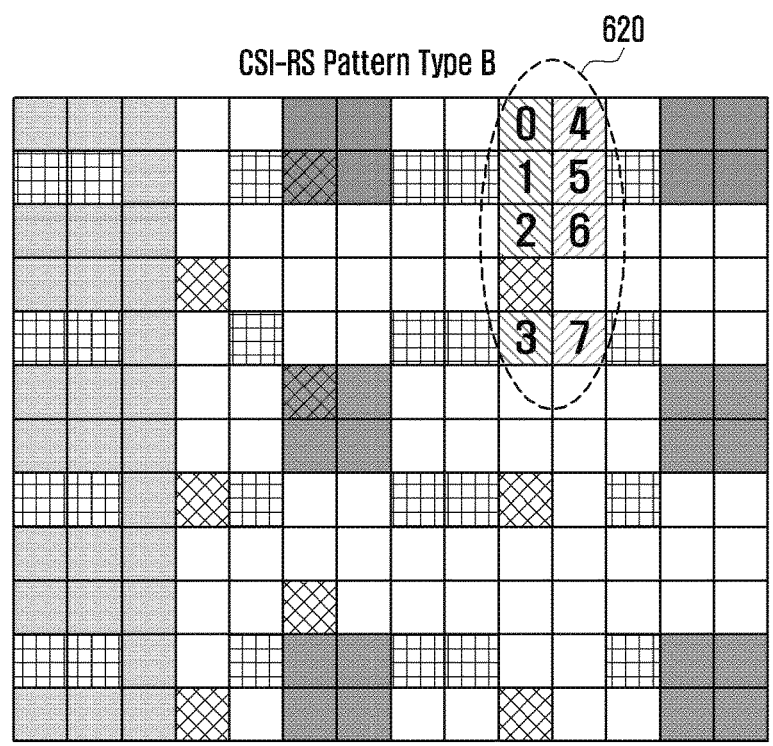

FIG. 14a
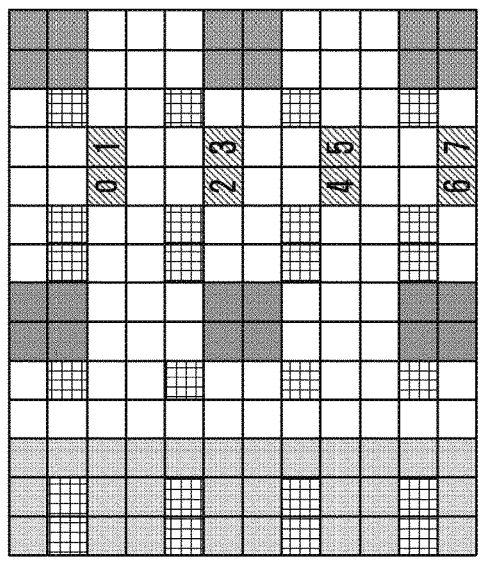
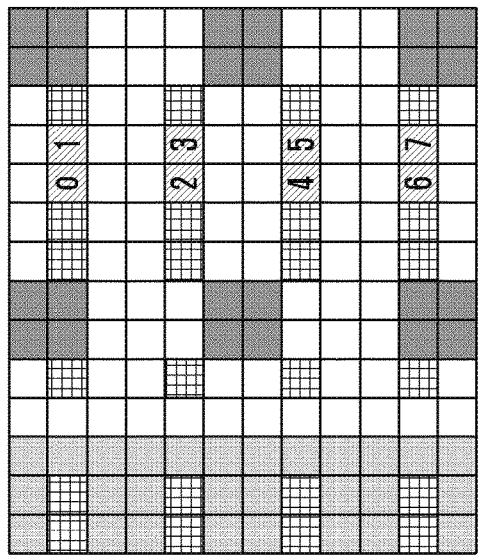
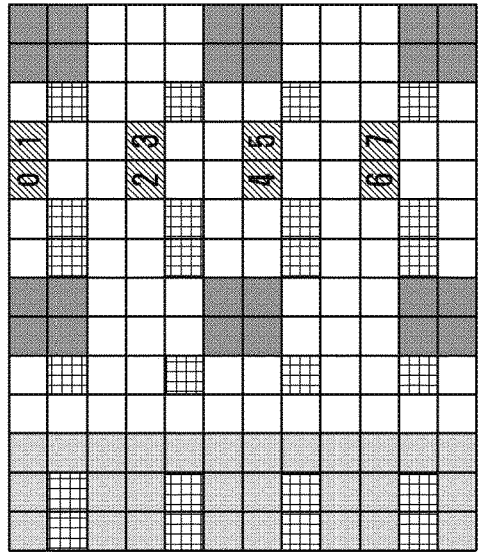
<8 Antenna Port CSI-RS Pattern>

<8 Antenna Port CSI-RS Pattern>

<2 Antenna Port CSI-RS Pattern>

FIG. 16
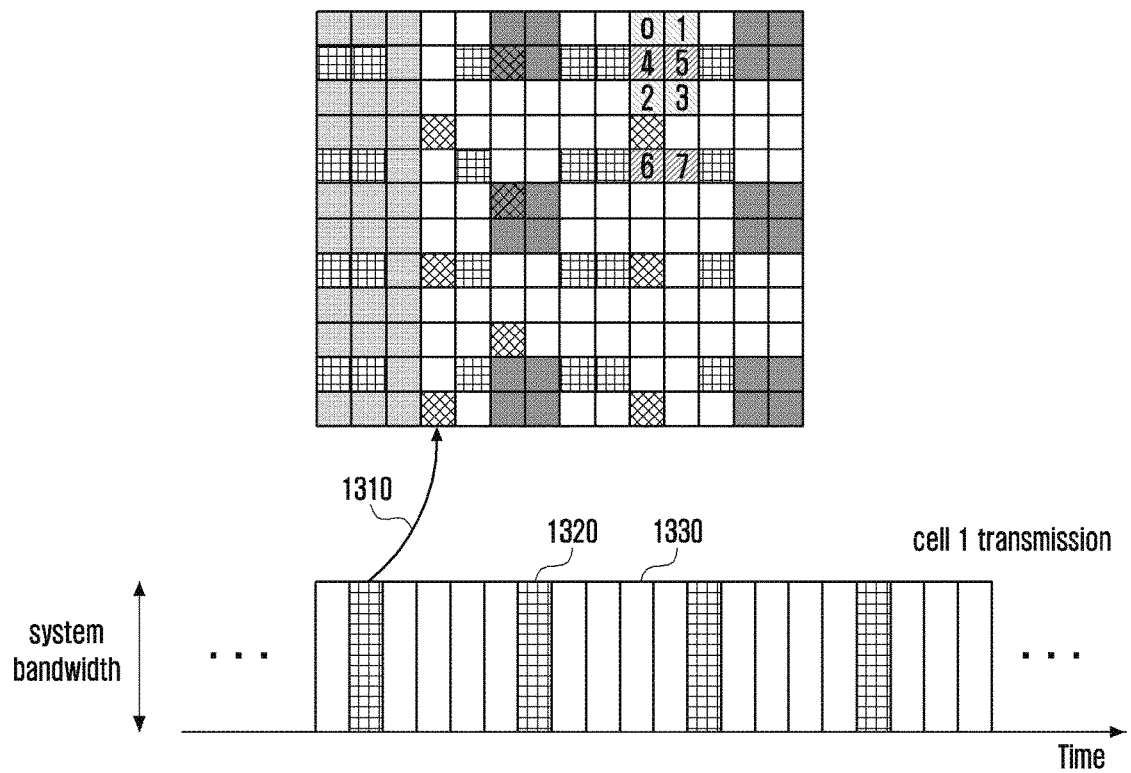
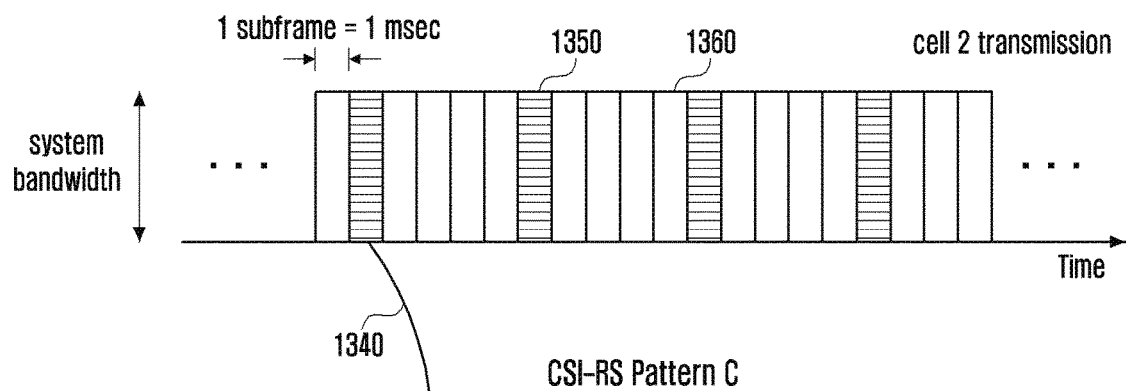
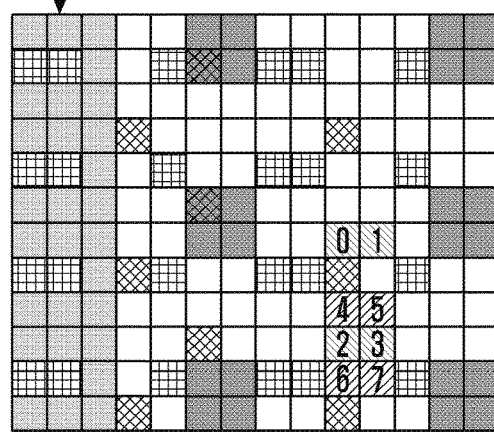

DEVICE AND METHOD FOR COMMUNICATING CHANNEL STATE INFORMATION REFERENCE SIGNAL (CSI-RS) IN WIRELESS COMMUNICATION SYSTEM

CROSS-REFERENCE TO RELATED APPLICATION(S)

This application is a continuation application of U.S. patent application Ser. No. 15/790,695, filed on Oct. 23, 2017, which will issue as U.S. Pat. No. 10,122,497 on Nov. 6, 2018; which is a continuation application of U.S. patent application Ser. No. 14/592,351, filed on Jan. 8, 2015, which has issued as U.S. Pat. No. 9,800,373 on Oct. 24, 2017; which is a continuation of U.S. patent application Ser. No. 14/154,770, filed on Jan. 14, 2014, which has issued as U.S. Pat. No. 9,077,519 on Jul. 7, 2015; which is a continuation of U.S. patent application Ser. No. 12/987,436, filed on Jan. 10, 2011, which has issued as U.S. Pat. No. 8,634,363 on Jan. 21, 2014; and was based on and claimed priority under 35 U.S.C. § 119(a) of Korean patent application numbers 10-2010-0002837 and 10-2010-0013005, filed on Jan. 12, 2010 and Feb. 11, 2010 respectively, in the Korean Intellectual Property Office, the disclosure of each of which is incorporated by reference herein in its entirety.

BACKGROUND OF THE INVENTION

1. Field of the Invention

The present invention relates to a wireless communication system. More particularly, the present invention relates to a method for processing a Channel State Information Reference Signal (CSI-RS) in a wireless communication system based on a multiple access scheme.

2. Description of the Related Art

In $3^{rd}$ Generation (3G) advanced wireless mobile communication system standards, two types of reference signals are specified, namely a Common Reference Signal (CRS) and a Dedicated Reference Signal (DRS). CRS is referred to as either a cell-specific RS or Common RS (CRS) in a 3G Partnership Project (3GPP) Long Term Evolution (LTE) standard and is monitored by all User Equipments (UEs) in a cell of a corresponding base station. For multiple antenna transmission, reference signal patterns are defined to distinguish between the antenna ports for channel estimation and measurement. In an LTE system, a maximum of 4 antenna ports can be supported. DRS denotes a reference signal that is separately transmitted from a CRS and listened to by a UE indicated by the base station. In a 3GPP LTE-Advanced (LTE-A) system, this reference signal is referred to as a UE-specific RS, a DRS, or a Demodulation Reference Signal (DMRS) and is used for supporting a data traffic channel transmission with non-codebook based precoding at the base station.

In the LTE-A system, which is an advanced form of the LTE system, a DeModulation Reference Signal (DM-RS) is transmitted for supporting channel estimation with 8 layers in addition to the aforementioned CRS and DRS.

FIG. 1 is diagram illustrating configurations of a radio frame, a subframe, and a Physical Resource Block (PRB) for transmitting CRS in an LTE system according to the related art.

Referring to FIG. 1, a radio frame is divided into 10 subframes, each having a length of 1 msec. This means that a radio frame has a length of 10 msec and consists of 10 subframes as shown in FIG. 1. In FIG. 1, reference number 110 denotes one of the subframes constituting the radio frame. For each subframe, an evolved Node B (eNB) performs transmission over the system bandwidth in Orthogonal Frequency Division Multiple Access (OFDMA). One subframe consists of a plurality of Physical Resource Blocks (PRBs). One PRB consists of 12 subcarriers. For one subframe, the subcarriers are arranged at a regular interval in the frequency domain. In FIG. 1, reference number 120 denotes one of the PRBs constituting the system bandwidth. In the LTE signal structure of FIG. 1, a number of PRBs is determined depending on the system bandwidth.

The PRB 120 is a time-frequency resource region as denoted by reference number 130. As denoted by reference number 130 of FIG. 1, each PRB is a time-frequency resource region consisting of 12 subcarriers in the frequency domain and 14 OFDMA symbol durations in the time domain. The resource unit defined by one subcarrier and one OFDM symbol duration is referred to as a Resource Element (RE), and one RE can carry one data symbol or reference signal symbol.

The PRB 130 consists of 12 subcarriers and 14 OFDM symbol durations. This means that a PRB 130 consists of a total of 168 REs. The first three OFDM symbol durations of the PRB 130 are assigned as a control region in which the eNB uses a control channel for transmitting control information with which the UE can receive a traffic channel. Although the control region is defined by the first three OFDM symbol durations, it can be configured with the first one or two OFDM symbol durations depending on the eNB's determination.

In FIG. 1, reference number 140 denotes a data RE for use in transmitting traffic channel. Reference number 150 denotes a CRS RE for use in transmitting a CRS for a UE's channel estimation and measurement. Since the positions of the data RE and CRS RE are known to the eNB and UE, the UE can receive the CRS and traffic channel correctly in the PRB. Unless specifically stated otherwise, all indexing starts from 0 in the following description. For example, in FIG. 1, the 14 OFDM symbols constituting the PRB are indexed from 0 to 13.

FIG. 2 is a diagram illustrating resources allocated for a UE to report a channel quality measurement to an eNB in an LTE system according to the related art.

Referring to FIG. 2, the UE measures a channel quality of all the PRBs within the system band for the subframe 230 including a plurality of PRBs. In order to measure the channel quality in each PRB, the UE uses the CRS 220 transmitted by the eNB. Since the CRS is transmitted at the same transmission power in all of the PRBs, the UE can determine which PRB has relatively higher channel quality by comparing the received signal strengths of the CRSs received in respective PRBs. Also, it is possible to determine the data rate which each PRB can support depending on the absolute received signal strength. The channel quality information is mapped in the form of channel feedback information and then reported to the eNB using the uplink control channel as denoted by reference number 240 of FIG. 2. Based on the channel feedback information transmitted by the UE, the eNB performs downlink transmission in the subframes 251, 252, 253, 254, and 255. The eNB can acquire the information on the data rate, preferable precoding, and preferable PRB supported by the UE based on the channel feedback information transmitted by the UE and performs downlink scheduling and Adoptive Modulation and Coding (AMC) based on the acquired information.

In FIG. 2, the eNB uses the channel feedback information 240 before the receipt of the next channel feedback information 260. Although it is depicted that only one UE transmits the channel feedback information in FIG. 2, a real world system is typically designed such that a plurality of UEs can transmit the channel feedback information simultaneously.

However, the method described above has a number of problems. For example, in the LTE system, the UEs measure the channel quality based on the CRS transmitted by the eNB. In case of measuring the channel quality with a CRS as shown in FIG. 2, the number of layers for the eNB to transmit with Multiple-Input Multiple-Output (MIMO) technology is limited by the number of antenna ports of a CRS. According to the standard, the LTE system can support up to 4 antenna ports. Since more than four CRS antenna ports are not supported, the MIMO transmission of the eNB is limited to a maximum of four layers.

Another problem with CRS-based channel estimation and measurement of the UEs is that the eNB must always transmit a CRS. Accordingly, in order to support more than four antenna ports, an additional CRS should be transmitted. This means that the limited radio resource is excessively concentrated on transmitting a CRS for channel estimation measurement, resulting in bandwidth inefficiency.

SUMMARY OF THE INVENTION

An aspect of the present invention is to address at least the above-mentioned problems and/or disadvantages and to provide at least the advantages described below. Accordingly, an aspect of the present invention is to provide a method for transmitting a Channel State Information Reference Signal (CSI-RS) that is capable of improving resource management efficiency of an evolved Node B (eNB) and channel measurement efficiency of a User Equipment (UE) in a Long Term Evolution Advanced (LTE-A) system.

Another aspect of the present invention is to provide a method for transmitting a CSI-RS that is capable of improving radio resource management efficiency in view of each eNB and separating the CSI-RSs transmitted in the cells of corresponding eNBs in the time domain and the frequency domain in view of multiple eNBs.

In accordance with an aspect of the present invention, a method for transmitting a CSI-RS in an Orthogonal Frequency Division Multiple Access (OFDMA) system is provided. The method includes determining a CSI-RS pattern type based on a Physical Resource Block (PRB) index of a subframe, assigning, when the subframe is supposed to carry the CSI-RS, CSI-RSs of first to $N^{th}$ antenna ports to first to $N^{th}$ Orthogonal Frequency Division Multiplexing (OFDM) symbols of a PRB based on the CSI-RS pattern type, and transmitting the subframe including the PRB in which CSI-RSs of the first to $N^{th}$ antennas a mapped, wherein the first to $N^{th}$ CSI-RS pattern types map CSI-RSs of the first to $N^{th}$ antenna ports to the first to $N^{th}$ OFDM symbols of the PRB in an alternate manner.

In accordance with another aspect of the present invention, a method for transmitting a CSI-RS in an OFDMA system is provided. The method includes determining cells in a Coordinated Multi Point (CoMP) set and sharing information related to CoMP CSI-RS transmission among the cells, determining, when transmitting a subframe, whether the subframe is supposed to carry a CSI-RS, determining, when the subframe is supposed to carry CSI-RS, whether the CSI-RS is a CoMP CSI-RS, and transmitting, when the CSI-RS is a CoMP CSI-RS, the CoMP CSI-RS and, when the CSI-RS is not CoMP CSI-RS, a non-CoMP CSI-RS, wherein the CoMP CSI-RS is the CSI-RS transmitted by a plurality of cells for a User Equipment (UE) to measure downlink channels of the cells, and the CoMP set is a set of the cells participating in cooperation for transmitting the CoMP CSI-RS.

In accordance with still another aspect of the present invention, a method for transmitting a Channel State Information-Reference Signal (CSI-RS) in an Orthogonal Frequency Division Multiple Access (OFDMA) system is provided. The method includes sharing information on CSI-RS patterns of adjacent cells and a number of CSI-RS antenna ports, determining, when a subframe is transmitted, whether the subframe is supposed to carry a CSI-RS by analyzing the CSI-RS patterns, transmitting, when CSI-RS transmission time is up, the subframe carrying the CSI-RS according to the CSI-RS pattern, and transmitting, at a CSI-RS transmission time of one of the adjacent cells, a subframe in which a number of Resource Elements (REs) corresponding to the number of CSI-RS antenna ports of the adjacent cells are muted.

In accordance with yet another aspect of the present invention, a method for wireless communication by a terminal is provided. The method includes receiving first information comprising a muting subframe interval, a subframe offset, and a muting position of a resource element in a resource block, checking presence of a data in a subframe, determining the resource element to be muted in the subframe based on the muting subframe interval, the subframe offset, and the muting position, if the data is present, and receiving the data on a physical downlink shared channel (PDSCH) based on the result of the determining step.

In accordance with still another aspect of the present invention, a method for wireless communication by a base station is provided. The method includes generating first information comprising a muting subframe interval, a subframe offset, and a muting position of a resource element in a resource block, transmitting the first information to a terminal, and transmitting a data on a physical downlink shared channel (PDSCH) based on the resource element to be muted in a subframe, wherein the resource element is determined based on the muting subframe interval, the subframe offset, and the muting position.

In accordance with yet another aspect of the present invention, a terminal is provided. The terminal includes a transceiver configured to transmit and receive a signal, and a controller configured to receive first information comprising a muting subframe interval, a subframe offset, and a muting position of a resource element in a resource block, check presence of a data in a subframe, determine the resource element to be muted in the subframe based on the muting subframe interval, the subframe offset, and the muting position, if the data is present, and receive the data on a physical downlink shared channel (PDSCH) based on the result of the determining step.

In accordance with still another aspect of the present invention, a base station is provided. The base station includes a transceiver configured to transmit and receive a signal, and a controller configured to generate first information comprising a muting subframe interval, a subframe offset, and a muting position of a resource element in a resource block, transmit the first information to a terminal, and transmit a data on a physical downlink shared channel (PDSCH) based on the resource element to be muted in a subframe, wherein the resource element is determined based on the muting subframe interval, the subframe offset, and the muting position.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 is a diagram illustrating a PRB having REs allocated for transmitting CSI-RSs alternately in an LTE-A system according to an exemplary embodiment of the present invention;

FIGS. 14a, 14b, and 14c are diagrams illustrating CSI-RS patterns designed to be assigned to a plurality of cells in a mobile communication system according to an exemplary embodiment of the present invention;

FIG. 16 is a diagram illustrating a principle for transmitting CSI-RSs of multiple cells with different CSI-RS patterns in a subframe according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
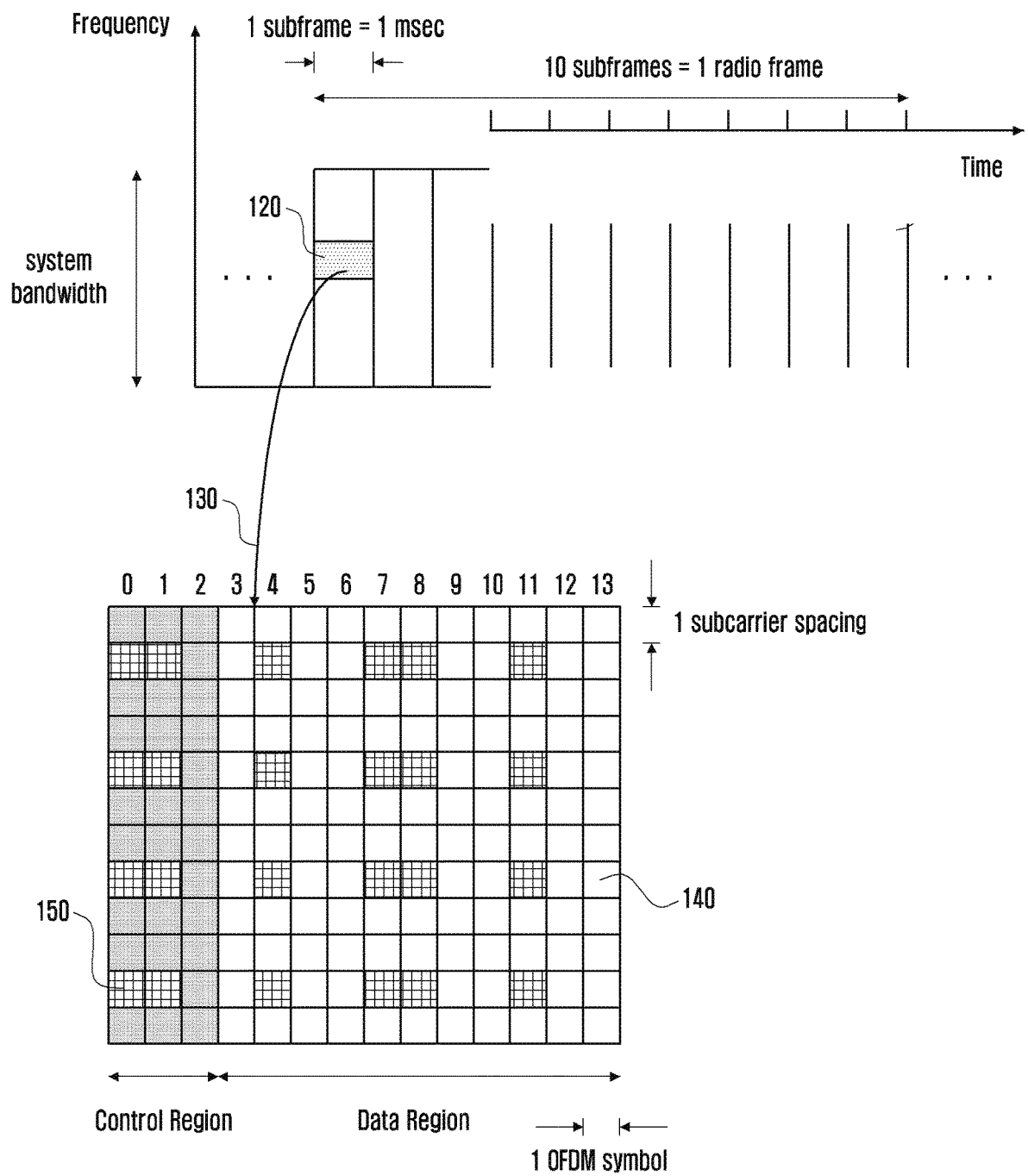
FIG. 1 is diagram illustrating configurations of a radio frame, a subframe, and a Physical Resource Block (PRB) for transmitting a Common Reference Signal (CRS) in a Long Term Evolution (LTE) system according to the related art.
Figure 2:
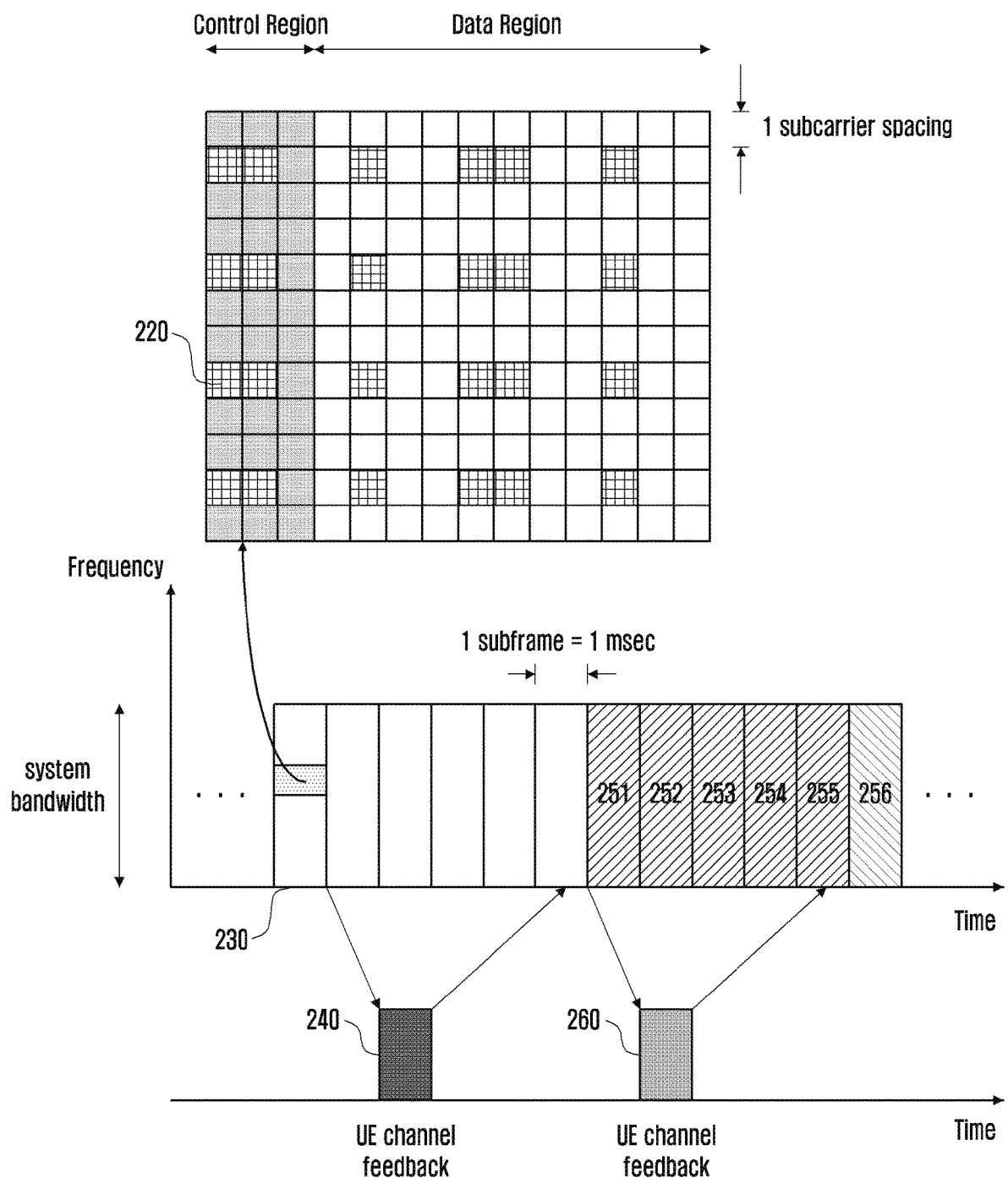
FIG. 2 is a diagram illustrating resources allocated for a User Equipment (UE) to report a channel quality measurement to an evolved Node B (eNB) in an LTE system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method for transmitting a Channel State Information Reference Signal (CSI-RS) and controlling CSI-RS transmission in which a User Equipment (UE) measures channel quality based on the CSI-RS transmitted by an evolved Node B (eNB) in a mobile communication system based on a multiple access scheme such as Orthogonal Frequency Division Multiple Access (OFDMA) using multiple carriers. That is, exemplary embodiments of the present invention propose a method for transmitting/receiving reference signals and managing reference signal transmission efficiently in multiple cells.

The mobile communication system has been developed as a high-speed, high-quality packet data communication system for providing various multimedia services as well as basic voice service. To this end, the standardization organizations such as the $3^{rd}$ Generation Partnership Project (3GPP), the 3GPP2, and the Institute of Electrical and Electronics Engineers (IEEE) are standardizing next generation mobile communication systems adopting multi-carrier-based multiple access schemes. Recently, various mobile communication standards such as 3GPP Long Term Evolution (LTE), 3GPP2 Ultra Mobile Broadband (UMB), and IEEE 802.16m have been developed to support high-speed, high-quality wireless packet data transmission service based on the multi-carrier multiple access scheme.

The advanced $3^{rd}$ Generation (3G) mobile communication systems such as LTE, UMB, and 802.16m are operating based on the multi-carrier multiple access schemes and adopt various techniques such as Multiple Input Multiple Output (MIMO), beamforming, Adaptive Modulation and Coding (AMC), and channel sensitive scheduling in order to improve transmission efficiency. These transmission techniques allow for the concentration of transmission power of multiple antennas or the adjustment of a data rate and improve system throughput with enhanced transmission efficiency by transmitting data selectively to the user having good channel quality. Most of these transmission techniques are based on the channel state information between the Base Station (BS) (e.g., an eNB) and a terminal (e.g., a UE or a Mobile Station (MS)), and CSI-RS is used as the channel state information. The eNB can be a downlink transmission and uplink reception device installed at a location, and an eNB can operate multiple cells. A mobile communication system includes a plurality of eNBs that are geographically distributed and each eNB manages transmission/reception in multiple cells.

Typically, the mobile communication system operates with limited time, frequency, and transmission power resources. Accordingly, allocating large amounts of resources for reference signals decreases the resources allocated for traffic channel transmission, resulting in a reduction in the amount of transmission. In this case, although the channel measurement and estimation performance is improved, the reduction of the amount of transmission data causes deterioration of overall system throughput. There is therefore a need to allocating resources efficiently for transmission of reference signals and traffic channel in order to optimize the performance in view of overall system throughput.

The reference signal is used to measure the channel state between the base station and the UE such as a signal strength and distortion per channel, interference, and Gaussian noise and determine the modulation and decoding of the received data symbol based on the measurements. The receiver measures the received strength of the reference signal transmitted by the transmitter at a promised transmission power so as to determine the radio channel state with the transmitter. The radio channel state is used to determine the data rate which the receiver requests from the transmitter.

The advanced 3G mobile communication standard such as 3GPP LTE-Advanced (LTE-A) or IEEE 802.16m adopts Orthogonal Frequency Division Multiplexing/Orthogonal Frequency Multiple Access (OFDM/OFDMA) as a multi-carrier multiple access transmission scheme. In the mobile communication system based on the multi-carrier multiple access scheme, the channel estimation and measurement performance can be influenced by the number of symbols in the time domain and the number of subcarriers in the frequency domain carrying the reference signals. Also, the channel estimation and measurement performance is influenced by the power allocated for transmission of reference signals. The more the time, frequency, and power are allocated, the more the channel estimation and measurement performance improves, and this results in the improvement of data symbol demodulation and decoding performance and channel state measurement accuracy.

However, since the resources such as the time, frequency, and transmission power are limited in a typical mobile communication system, an excessive increase of resource allocation for a reference signal causes a decrease of the resources for transmission of a data signal. For this reason, the resource allocation for the reference signals should be determined in consideration of system throughput.

An exemplary embodiment of the present invention proposes a method for transmitting/receiving reference signals for channel quality measurement of radio channels and managing the reference signal transmission efficiently in multiple cells.

Figure 3:
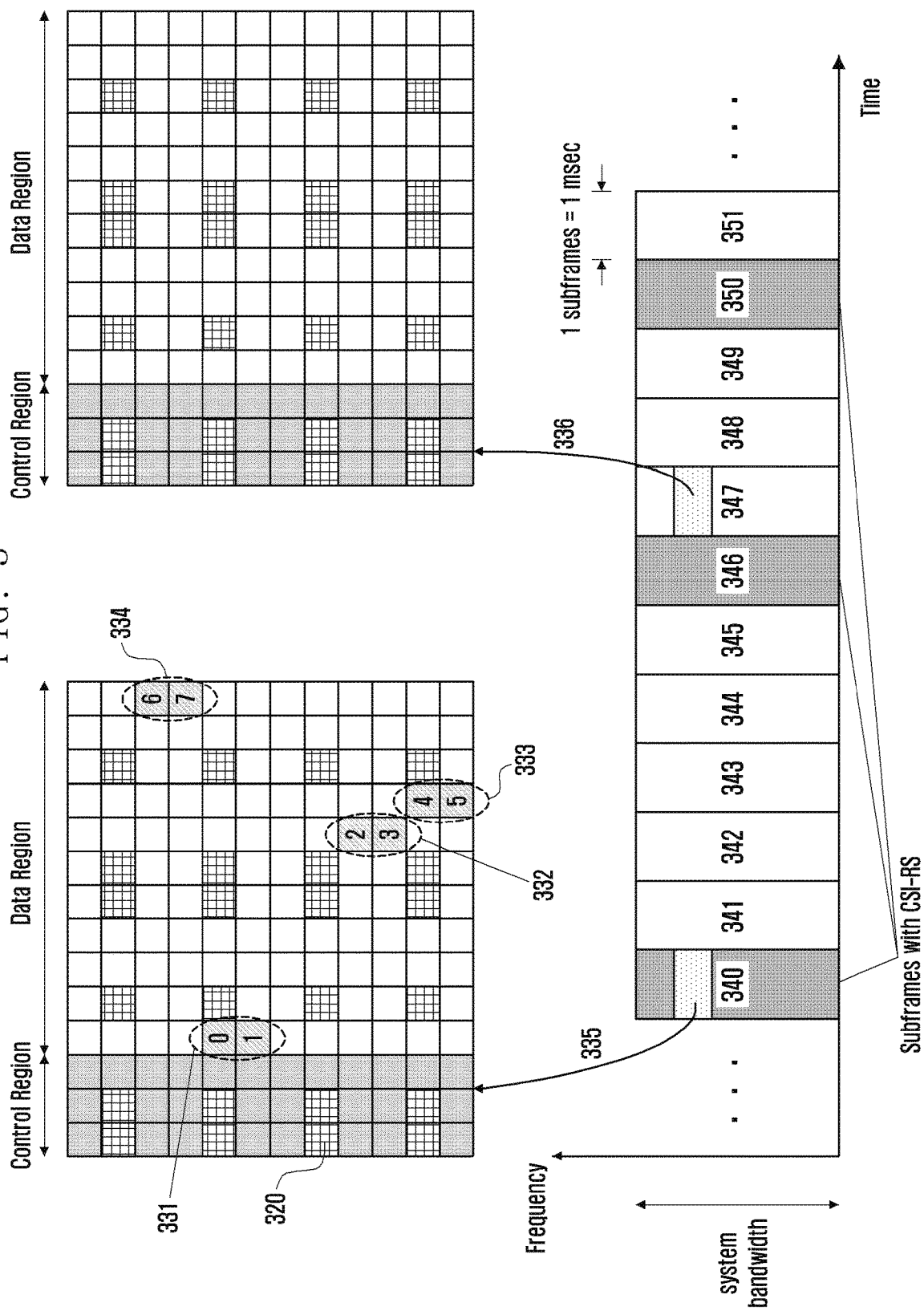
FIG. 3 is a diagram illustrating a Channel State Information Reference Signal (CSI-RS) transmission of an eNB in an LTE-Advanced (LTE-A) system according to an exemplary embodiment of the present invention.

FIG. 3 is a diagram illustrating CSI-RS transmission of an eNB in an LTE-A system according to an exemplary embodiment of the present invention.

Referring to FIG. 3, in an LTE-A system downlink transmission is performed in a unit of 1 msec in the time domain and 1 Physical Resource Block (PRB) in the frequency domain. Here, a PRB consists of 12 subcarriers. The 1 msec time duration consists of 14 OFDM symbols. 12 subcarriers per PRB and 14 OFDM symbols per 1 msec are implemented when the LTE or LTE-A system uses the subcarriers spaced at 15 KHz intervals and the normal cyclic prefix. However, the LTE or LTE-A system also may use the subcarriers spaced at 7.5 KHz intervals and the extended cyclic prefix.

In FIG. 3, the eNB transmits subframes 340 to 351. In this case, the subframes 340, 345, and 350 among the subframes 340 to 351 are used to carry the CSI-RSs. That is, the CSI-RS is transmitted at an interval of 5 msec or 5 subframes. If the subframe 340 carries the CSI-RS, this means the CSI-RS is transmitted in one or more PRBs of the subframe 340. In FIG. 3, reference number 335 denotes the PRB carrying the CSI-RS among a plurality of PRBs constituting the subframe 340. In the PRB 335, individual CSI-RSs 331, 332, 333, and 334 are transmitted on the corresponding antenna ports. That is, the CSI-RS 331 is transmitted on the antenna ports 0 and 1, whereas the CSI-RS 332 on the antenna ports 2 and 3.

In FIG. 3, reference number 336 denotes the PRB which does not carry CSI-RS. The PRB which does not carry the CSI-RS is transmitted in the form denoted by reference number 336 and compared to the PRB 335 carrying the CSI-RS.

The LTE-A system differs from the LTE system in that the LTE-A UEs performs channel measurement using CSI-RSs 331, 332, 333, and 334 rather than CRS 320.

In order to design an efficient CSI-RS transmission scheme, it is the locations in which the CSI-RSs are transmitted in the time-frequency grid that should be determined.

Figure 4:
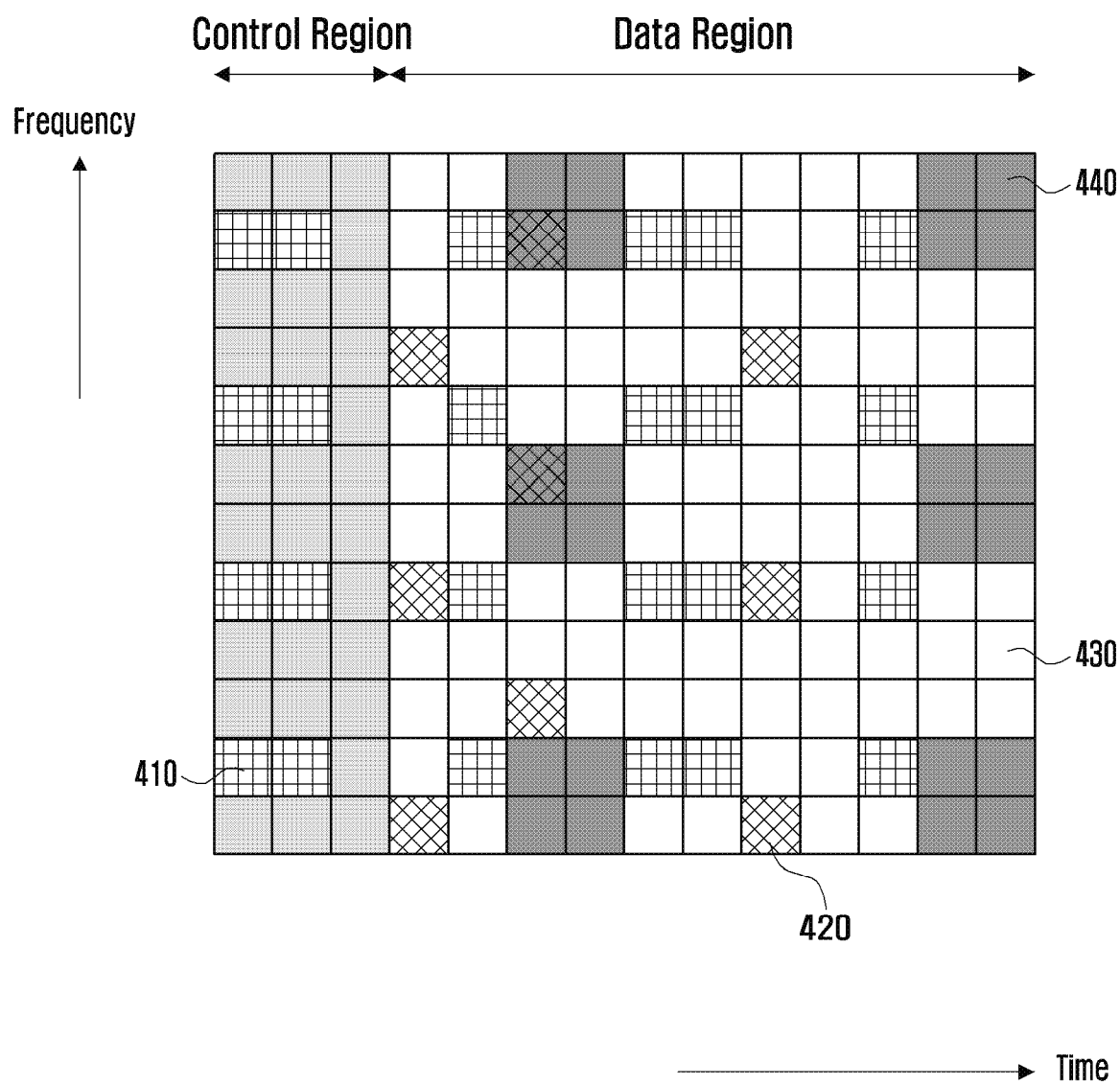
FIG. 4 is a diagram illustrating locations of the CSI-RS in a time frequency grid for an LTE-A system according to an exemplary embodiment of the present invention.

FIG. 4 is a diagram illustrating locations of a CSI-RS in a time frequency grid for an LTE-A system according to an exemplary embodiment of the present invention.

As shown in FIG. 4, the PRB includes various types of Resource Elements (REs). Here, the RE is defined by one subcarrier in the frequency domain and one OFDM symbol duration in the time domain and is the smallest unit of resource for transmission in the LTE and LTE-A systems. In FIG. 4, each of the squares indicates an RE. Here, there are a total of 12×14 squares and thus a total of 12×14 REs.

Referring to FIG. 4, the first three OFDM symbol durations (i.e., $0^{th}$ to $2^{nd}$ OFDM symbols) are the control region in which only the control signal and CRSs (e.g., CRS 410) are transmitted. The control region is monitored by the LTE UEs operating in the LTE-A system and as a consequence there is no need to carry the CSI-RSs. From the $3^{rd}$ to the last OFDM symbol durations (i.e., $3^{rd}$ to $13^{th}$ OFDM symbols) are a data region in which a traffic channel signal, an LTE UE-dedicated reference signal for channel estimation (or in LTE-A, a UE-specific RS), and a CRS can be transmitted. Since the CSI-RS cannot be transmitted in the control region, it must be transmitted in the data region (such as at RE 430). Although the CSI-RS can be transmitted in the data region, it should be avoided to locate it in the REs at which the CSI-RS can influence the conventional LTE transmission operation. The representative REs that should not be assigned for the CSI-RS are the REs in the $4^{th}$, $7^{th}$, $8^{th}$, and $11^{th}$ OFDM symbols, the REs reserved for the LTE UE-specific reference signal as denoted by reference number 420 of FIG. 4, and the REs reserved for the LTE-A UE-specific reference signal as denoted by reference number 440 of FIG. 4.

Figure 5:
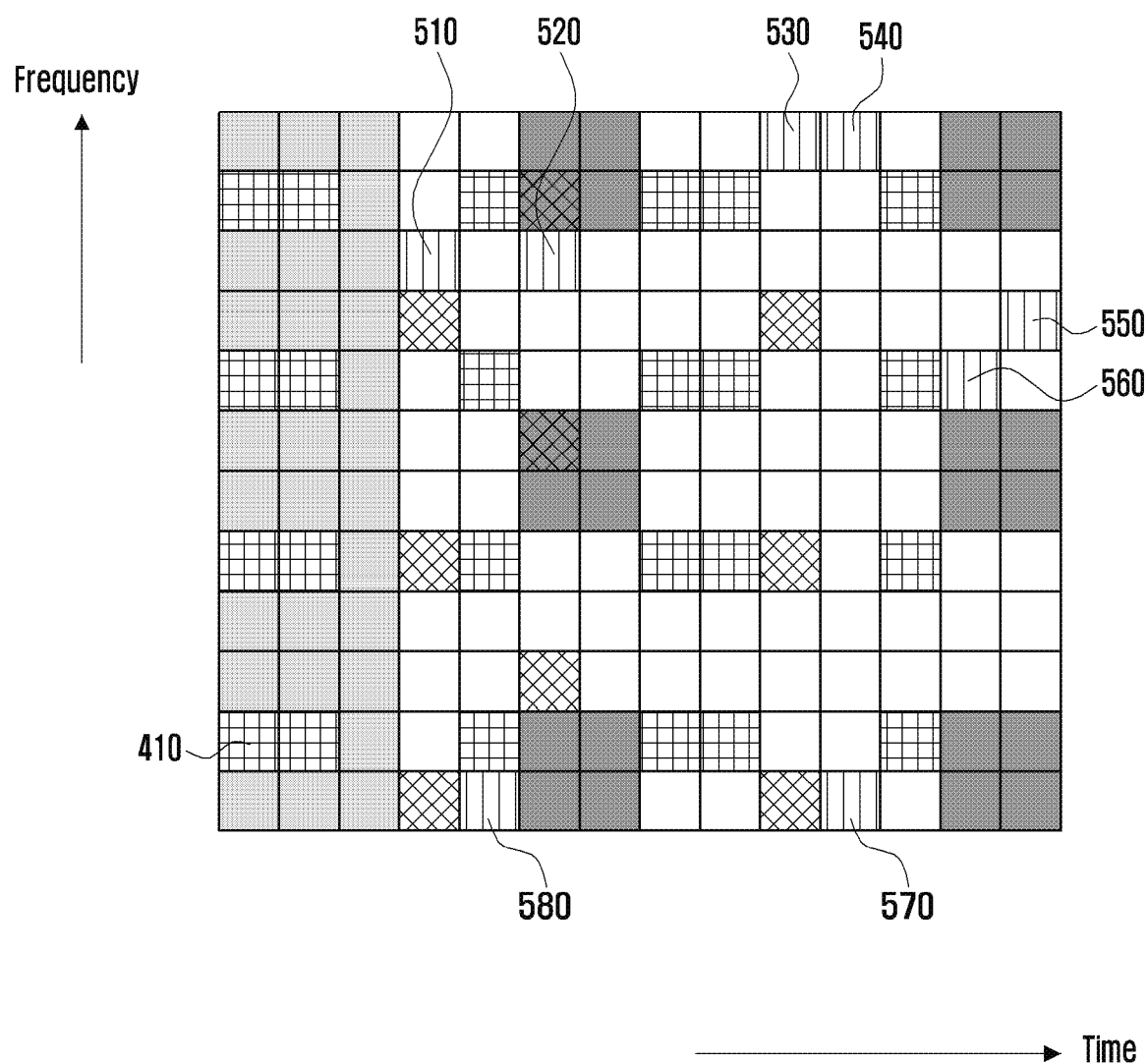
FIG. 5 is a diagram illustrating a PRB having Resource Elements (REs) allocated for transmitting CSI-RSs in an LTE-A system according to an exemplary embodiment of the present invention.

FIG. 5 is a diagram illustrating a PRB having REs allocated for transmitting CSI-RSs in an LTE-A system according to an exemplary embodiment of the present invention.

Referring to FIG. 5, the CSI-RSs positioned at the REs 510, 520, 530, 540, 550, and 560 are the only CSI-RS in each OFDM symbols of the PRB. This means that, in the OFDM symbol carrying the CSI-RS, only one CSI-RS can be transmitted on an antenna port. Transmitting one CSI-RS on the single antenna port in an OFDM symbol is inefficient in view of transmission power management of the eNB. If transmitting only one CSI-RS for a single antenna port in one OFDM symbol as shown in FIG. 5, even when the eNB is configured with a plurality of antenna ports, transmission power at the remaining antenna ports is wasted. In an exemplary case where the CSI-RSs for the four antenna ports are transmitted in the PRB as shown in FIG. 5, the OFDM symbol having the RE 510 carries the CSI-RS for a specific antenna port. The problem is that, since the CSI-RS for only one antenna port is transmitted, the transmission power allocated for the other three antenna ports are not utilized.

The problem also occurs when the CSI-RSs for the two antenna ports are transmitted in an OFDM symbol. The CSI-RSs 540 and 570 are transmitted in the same OFDM symbol for the respective antenna ports. The problem is that, when the number of antenna ports of the eNB is greater than 2, the transmission power at the antenna ports except for the antenna ports for which the CSI-RSs 540 and 570 are transmitted are not utilized as aforementioned.

One approach to use the transmission powers of all the antenna ports of the eNB is to transmit the CSI-RSs for all the antenna ports in one OFDM symbol. However, this approach has a limitation in consideration that one PRB consists of only 12 subcarriers, the maximum number of antenna ports is 8, and some REs cannot be allocated for CSI-RS.

An exemplary embodiment of the present invention proposes a method for utilizing the transmission powers of all the antenna ports of the eNB in which the eNB applies the CSI-RSs of antenna ports to different PRBs alternately.

FIG. 6 is a diagram illustrating a PRB having REs allocated for transmitting CSI-RSs alternately in an LTE-A system according to an exemplary embodiment of the present invention.

Referring to FIG. 6, the eNB transmits the CSI-RS in the first OFDM symbol and the second OFDM symbol. In order to use the transmission power of all the antenna ports, the eNB transmits the CSI-RS in a first CSI-RS pattern for the some PRBs and in a second CSI-RS pattern for other PRBs. In the first CSI-RS pattern, the CSI-RSs for the first set of antenna ports are transmitted in the first one of the two contiguous OFDM symbols, and the CSI-RSs for the second set of antenna ports are transmitted in the second one of the two contiguous OFDM symbols; and in the second CSI pattern, the CSI-RSs for the second set of antenna ports are transmitted in the preceding-OFDM symbol, and the CSI-RSs for the first set of antenna ports are transmitted in the following-OFDM symbol.

In FIG. 6, the first one OFDM symbol can be the 9th OFDM symbol, and the second one OFDM symbol can be the 10th OFDM symbol in the PRB. The first CSI-RS pattern can be the CSI-RS pattern type A 610, and the second CSI-RS pattern can be the CSI-RS pattern type B 620.

In FIG. 6, it is assumed that the eNB transmits the CSI-RSs in the $9^{th}$ and $10^{th}$ OFDM symbols. At this time, the eNB can transmit the CSI-RS in the CSI-RS pattern type A 610 and the CSI-RS pattern type B 620. In the CSI-RS pattern type A 610, the CSI-RSs for the antenna ports 4, 5, 6, and 7 are transmitted in the $9^{th}$ OFDM symbol and the CSI-RSs for the antenna ports 0, 1, 2, and 3 are transmitted in the $10^{th}$ OFDM symbol. Whereas, in the CSI-RS pattern type B 620, the CSI-RSs for the antenna ports 0, 1, 2, and 3 are transmitted in the $9^{th}$ OFDM symbol, and the CSI-RSs for the antenna ports 4, 5, 6, and 7 are transmitted in the $10^{th}$ OFDM symbol. The eNB configures the half of the PRBs carrying the CSI-RSs in the CSI-RS pattern type A 610 and the other half of the PRBs carrying the CSI-RSs in the CSI-RS pattern type B 620 within the system bandwidth.

Defining a plurality of CSI-RSs and transmitting the CSI-RSs in the PRBs at an identical rate within the system bandwidth has the following advantages. First, a number of CSI-RSs transmitted in the OFDM symbol is identical with that of the antenna ports. Second, the CSI-RSs can be transmitted in multiple OFDM symbols.

The first advantage can be fulfilled when, although the CSI-RSs for different antenna ports are transmitted in the same OFDM symbol with the CSI-RS pattern type A and CSI-RS pattern type B, the two patterns are used simultaneously such that the CSI-RSs for all the antenna ports exist in a single OFDM symbol duration. Assuming an exemplary case of the system bandwidth including two PRBs in which a first one PRB carries the CSI-RS in the CSI-RS pattern type A and the second one PRB carries the CSI-RS in the CSI-RS pattern type B, the CSI-RSs for all the antenna ports are transmitted in each of the $9^{th}$ and $10^{th}$ OFDM symbols. In a case that the CSI-RSs for all the antenna ports are transmitted in a single OFDM symbol, it is possible to use the transmission powers of all antenna ports. The second advantage can be fulfilled with a high degree of freedom for determining the transmission locations of the CSI-RSs by using multiple OFDM symbols for CSI-RS transmission. Assuming that CSI-RSs for 8 antenna ports are transmitted in a single OFDM symbol, the CSI-RSs cannot be transmitted in the $5^{th}$, $6^{th}$, $12^{th}$, and $13^{th}$ OFDM symbols since there are only 6 REs in each of the $5^{th}$, $6^{th}$, $12^{th}$, and $13^{th}$ OFDM symbols.

Figure 7:
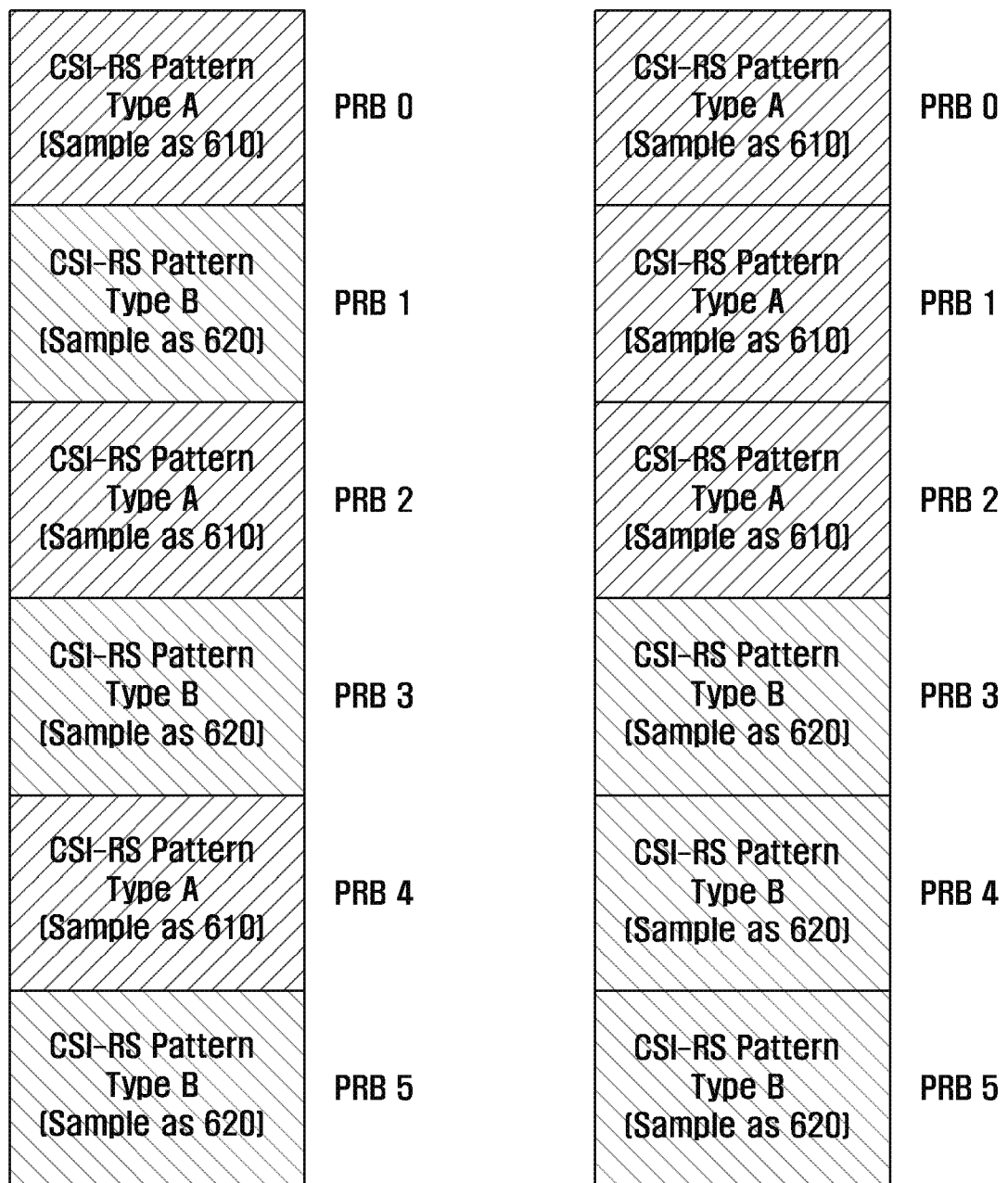
FIG. 7 is a diagram illustrating a principle of transmitting CSI-RSs with CSI-RS pattern type A and CSI-RS pattern type B of FIG. 6 in a system bandwidth according to an exemplary embodiment of the present invention.

FIG. 7 is a diagram illustrating a principle of transmitting CSI-RSs with a CSI-RS pattern type A and a CSI-RS pattern type B of FIG. 6 in a system bandwidth according to an exemplary embodiment of the present invention.

Referring to FIG. 7, the part 710 shows an exemplary CSI-RS pattern determination scheme in which whether to use the CSI-RS pattern type A 610 or the CSI-RS pattern type B 620 is determined based on the PRB index, i.e., based on whether the PRB index is an odd number or an even number. In the part 710 of FIG. 7, the PRBs of which indices are even numbers (i.e., 0, 2, 4, 6, . . . ) are determined to use the CSI-RS pattern type A 610 for transmission of the CSI-RSs, and the PRBs of which indices are odd numbers (i.e., 1, 3, 5, 7, . . . ) are determined to use the CSI-RS pattern type B 620 for the transmission of the CSI-RSs. The part 720 shows another exemplary CSI-RS pattern determination scheme in which whether to use the CSI-RS pattern type A 610 or the CSI-RS pattern type B 620 is determined based on whether the PRB index has a value less than half of the maximum value (i.e., K/2, where K is the maximum value of the PRB index). In the part 720 of FIG. 7, the PRBs of which indices are less than half of the maximum value of PRB index (i.e., PRB 0 to PRB 2) are determined to use the CSI-RS pattern type A 610, and the PRBs of which indices are greater than half of the maximum value of PRB index (i.e., PRB 3 to PRB 5) are determined to use the CSI-RS pattern type B 620.

Although FIG. 7 is depicted under the assumption that two CSI-RS patterns are used for transmission of CSI-RSs, the number of CSI-RS patterns can be generalized by N as follows. Here, assume that K PRBs exist in the system bandwidth (i.e., maximum value of PRB index is K).

Solution 1: if PRB index is i, use (i mod N)$^{th}$ CSI-RS pattern type.

Solution 2: if PRB index is i, use $\lfloor i/(K/N) \rfloor^{th}$ CSI-RS pattern type.

Solutions 1 and 2 are of the case where the CSI-RSs are transmitted in all the PRBs, but can be applied to the cases where CSI-RSs are not transmitted in all the PRBs similarly. In an exemplary case where the CSI-RSs are transmitted every Lth PRB (e.g., every $5^{th}$ PRB, L=5), the solutions 1 and 2 can be applied in identical manner. In a case where the CSI-RSs are transmitted in an Lth PRB at an identical interval in the frequency domain, the PRB for transmitting the CSI-RSs can be determined based on the PRB index according to Table 1.

TABLE 1

| If PRB index i |
|---|
| If (i + offset) mod L = 0, PRB is transmitting CSI-RS |
| If (i + offset) mod L ≠ 0, PRB is not transmitting CSI-RS |

In Table 1, the offset value is a variable for determining the location in an interval when to determine the PRB is for transmitting a CSI-RS at a regular interval. Even when the CSI-RSs are transmitted in the PRB determined as above, the solutions 1 and 2 can be applied in the same manner as the following solutions 3 and 4.

Solution 3: if PRB index is i and the PRB carries CSI-RSs, use $\lfloor i/L \rfloor$ mod N) or ((i-offset)/L) mod N$^{th}$ CSI-RS pattern type.

Solution 4: if PRB index is i and the PRB carries CSI-RSs, use ($\lfloor i/(K/N) \rfloor)^{th}$ CSI-RS pattern type.

Such a CSI-RS transmission method can be informed to the UE in the LTE (or LTE-A) system through signaling. That is, in the LTE (or LTE-A) system, the UE can be notified of one of the first to fourth solutions and the CSI-RS pattern type and then transmit the CSI-RSs to the UE in the CSI-RS pattern type determined by the PRB index at the CSI-RS transmission timing.

Figure 8:
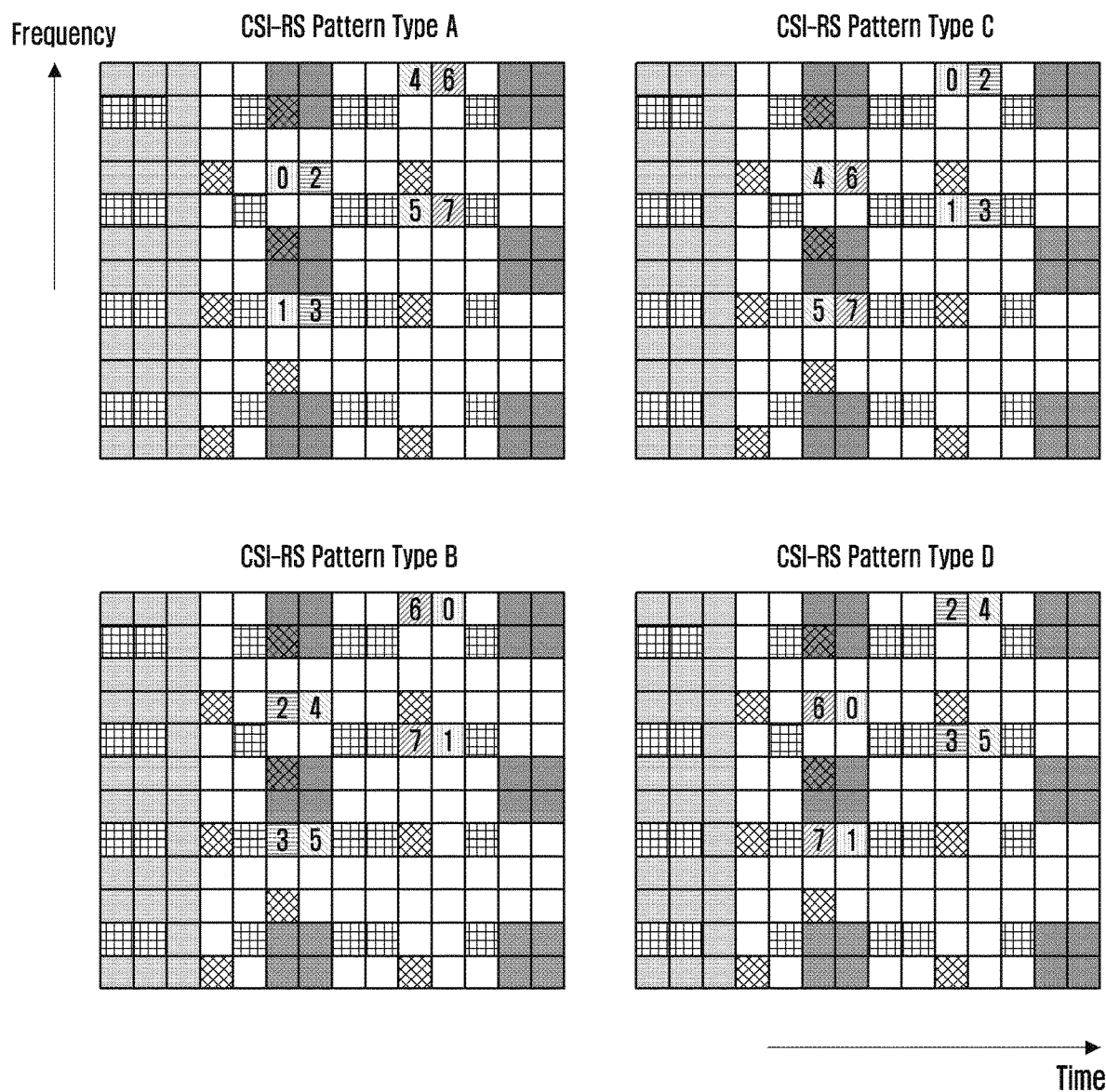
FIG. 8 is a diagram illustrating a principle of transmitting CSI-RSs of antenna ports alternately in different PRBs with four CSI-RS patterns according to an exemplary embodiment of the present invention.

FIG. 8 is a diagram illustrating a principle of transmitting CSI-RSs of antenna ports alternately in different PRBs with four CSI-RS patterns according to an exemplary embodiment of the present invention.

Referring to FIG. 8, each CSI-RS pattern is designed for CSI-RSs transmitted in four OFDM symbols. In this case, four CSI-RS pattern types (i.e., type A to type D) are defined as shown in FIG. 8 such that the CSI-RSs of all antenna ports can be transmitted in a single OFDM symbol. How to allocate resources for the CSI-RSs in multiple PRBs within the system bandwidth can follow the CSI-RS pattern type determination method using the PRB indices as described with reference to FIG. 7.

The CSI-RS patterns used for utilizing the transmission power of all antenna ports as shown in FIGS. 6 and 8 are characterized by the cyclic rotation of the antenna ports corresponding to the CSI-RSs to be transmitted. In the case of FIG. 8, it is observed that the CSI-RSs of the antenna ports that are transmitted in the $5^{th}$, $6^{th}$, $9^{th}$, and $10^{th}$ OFDM symbols are cyclically rotating in the time domain. This cyclic rotation feature is used to define the CSI-RS pattern for use of the transmission power of all antenna ports.

When designing the CSI-RS transmission, it should be taken into account which radio resources are allocated by multiple eNBs for CSI-RS transmission and for the CSI-RSs of multiple cells of one eNB. CSI-RS is the signal for the UEs to support LTE-A operations. Accordingly, in order to measure the radio channel state more accurately, the eNB may transmit the CSI-RS, for each cell, at a higher power level than that for the data signal transmission. Setting the transmission power for the CSI-RS transmission higher than that for the data signal transmission means that the transmission power of the RE carrying a CSI-RS is higher than that of the RE carrying data. In a case where the CSI-RS RE is allocated the transmission power higher than that of the data RE and different cells transmit the CSI-RS at the same RE positions, the CSI-RSs transmitted by the different cells are likely to interfere with each other. In this case, even when the CSI-RS is at a relatively higher transmission power, the positive effect of the channel measurement is diminished. Accordingly, there is a need for a method to perform the channel measurement accurately even with the relatively higher CSI-RS transmission power. In order to address this problem, an exemplary embodiment of the present invention proposes using individual CSI-RS patterns that can be allocated to multiple cells. In an exemplary embodiment of the present invention, a plurality of CSI-RSs is defined to be assigned to the cells constituting the cellular system.

Figure 9:
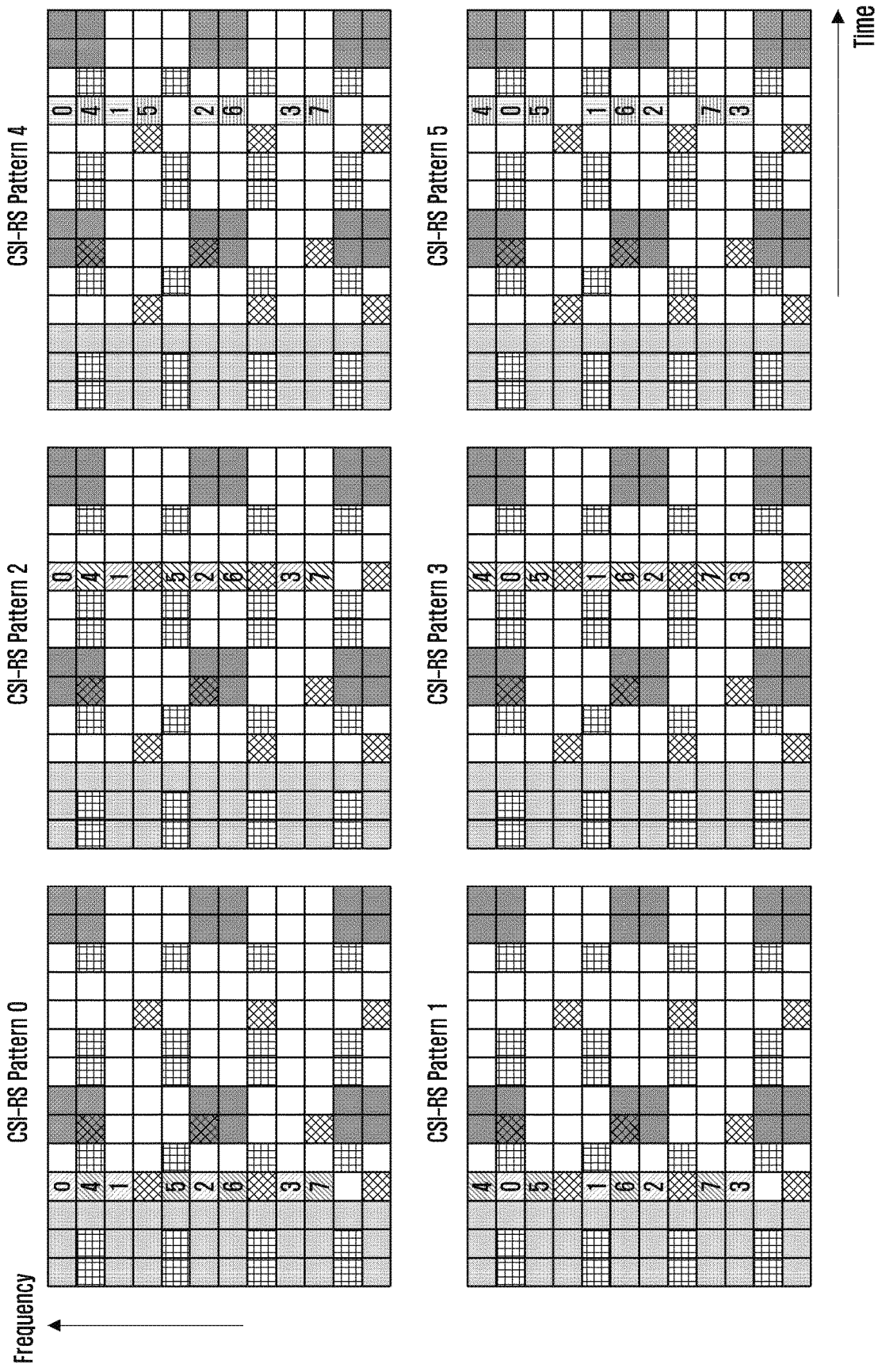
FIG. 9 is a diagram illustrating CSI-RS patterns designed to be assigned to a plurality of cells in a mobile communication system according to an exemplary embodiment of the present invention.

FIG. 9 is a diagram illustrating CSI-RS patterns designed to be assigned to a plurality of cells in a mobile communication system according to an exemplary embodiment of the present invention.

Referring to FIG. 9, a plurality of CSI-RS patterns designed to carry the CSI-RSs are shown. The CSI-RS patterns are allocated such that the cells use the resources at the different times and frequencies in order to avoid the overlapping the CSI-RS transmission positions of the cells by as much as possible. The CSI-RS patterns are allocated to transmit the CSI-RS of multiple antenna ports in the same OFDM symbol and use different resources with different OFDM symbols in the time domain. In a case of using the same OFDM symbol, the CSI-RS patterns are designed such that CSI-RSs of the antenna ports are arranged alternately to occupy different resources in the frequency domain within the system bandwidth.

The 6 CSI-RS patterns defined in FIG. 9 are allocated to different cells in a distributed manner to avoid the overlap of the locations for the CSI-RS transmission by as much as possible. In FIG. 9, CSI-RS pattern 0 is composed of the REs different from those of the CSI-RS patterns 2, 3, 4, and 5. For this reason, even though the transmission powers of the CSI-RSs transmitted by other cells with the CSI-RS patterns 2, 3, 4, and 5 are increased, the UE can measure the channel with the CSI-RS transmitted by the cell using the CSI-RS pattern 0 without additional interference. The reason why the CSI-RS transmitted in the CSI-RS pattern 0 is not interfered by the CSI-RSs transmitted in the CSI-RS patterns 2, 3, 4, and 5 is because different time and frequency resources are used, and this is achieved regardless of the number of CSI-RS antenna ports. In an exemplary case where CSI-RSs are transmitted for two antenna ports, it is possible to prevent the interference from occurring by transmitting the CSI-RSs at the positions for the antenna ports 0 and 1.

In FIG. 9, the CSI-RS pattern 0 and the CSI-RS pattern 1 may cause interference with each other. In a case where the number of antennas of which CSI-RSs are transmitted in the CSI-RS pattern 0 is equal to or less than 4 and the number of antennas of which CSI-RSs are transmitted in the CSI-RS pattern 1 is equal to or less than 4, the CSI-RSs transmitted in the CSI-RS patterns 0 and 1 do not interfere with each other. Interference occurs either when the number of antennas of which CSI-RSs are transmitted in the CSI-RS pattern 0 is greater than 4 or the number of antennas of which CSI-RSs are transmitted in the CSI-RS pattern 1 is greater than 4. The reason why the interference occurs in some limited cases is because the CSI-RS patterns are designed such that the CSI-RSs alternate in the same OFDM symbol. That is, the order of the antenna ports of which CSI-RSs are transmitted in the CSI-RS pattern 0 is 0, 4, 1, 5, 2, 6, 3, and 7, whereas the order of the antenna ports of which CSI-RSs are transmitted in the CSI-RS pattern 1 is 4, 0, 5, 1, 6, 2, 7, and 3 in the same OFDM symbol.

The principle described with regard to the CSI-RS pattern 0 is applied to the CSI-RS patterns 1, 2, 3, 4, and 5 identically. The CSI-RS patterns defined in an exemplary embodiment of the present invention as shown in FIG. 9 can be applied to the mobile communication system composed of a plurality of cells.

Figure 10:
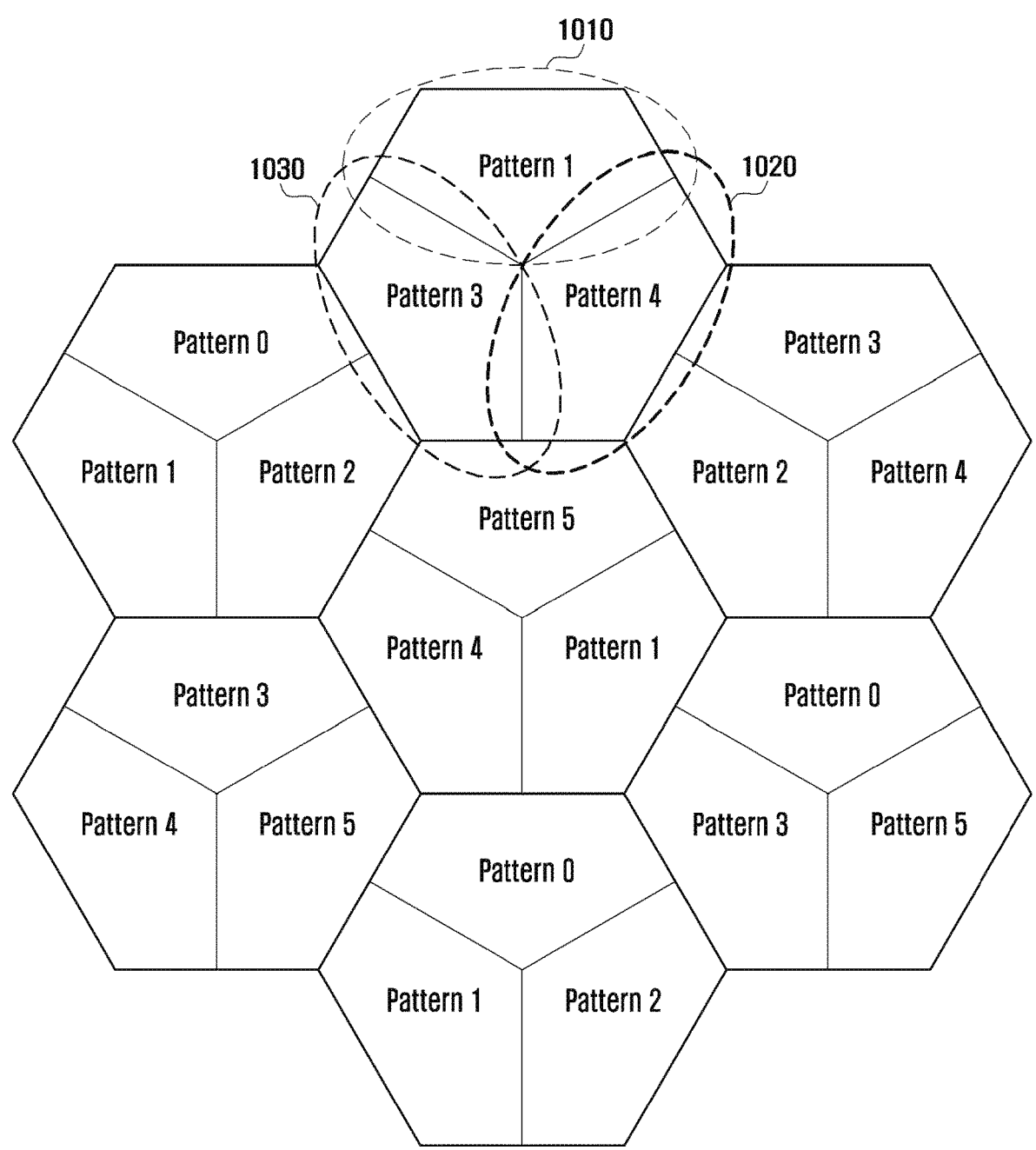
FIG. 10 is a diagram illustrating a cellular layout of a mobile communication system adopting the CSI-RS patterns as defined in FIG. 9 according to an exemplary embodiment of the present invention.

FIG. 10 is a diagram illustrating a cellular layout of a mobile communication system adopting CSI-RS patterns as defined in FIG. 9 according to an exemplary embodiment of the present invention.

Referring to FIG. 10, the mobile communication system is composed of 7 hexagonal service areas of individual eNBs, and each service area is divided into three cells. In the three cells of each service area, the CSI-RSs are transmitted in different CSI-RS patterns. For example, the eNB having three cells 1010, 1020, and 1030 transmits a CSI-RS in the CSI-RS pattern 0 within cell 1010, in the CSI-RS pattern 4 within cell 1020, and in the CSI-RS pattern 3 within cell 1030.

In order to assign the CSI-RS patterns as defined in FIG. 9 to the cells of the mobile communication system as shown in FIG. 10, an exemplary embodiment of the present invention proposes the use of cell IDs. According to an exemplary embodiment of the present invention, if the cell ID is NCell_ID, the CSI-RS pattern ID is determined by Equation (1).

$$\text{CSI\_RS Pattern ID} = \text{NCell\_ID mod } 6 \qquad \text{Equation (1)}$$

With Equation (1), it is possible to assign the six CSI-RS patterns of FIG. 9 according to the cell IDs assigned to the individual cells without separate signaling between the eNB and UEs. In addition to the method using Equation (1), it is possible to determine which CSI-RS patterns are to be assigned to the cells through higher layer signaling and notify the CSI-RS patterns to the UEs in the form of control information.

One approach to assign the CSI-RS pattern is to classify the CSI-RS patterns into more than two groups and use the CSI-RSs of each group for different purposes. For example, the six CSI-RS patterns of FIG. 9 can be grouped into two groups, namely group A and group B. In this case, it is assumed that group A includes CSI-RS pattern 0, CSI-RS pattern 2, and CSI-RS pattern 4, and group B includes CSI-RS pattern 1, CSI-RS pattern 3, and CSI-RS pattern 5. If the six CSI-RS patterns of FIG. 9 are grouped into group A and group B in this manner, it is possible to avoid the overlap between the CSI-RSs of the CSI-RS patterns in each of group A and group B. That is, the CSI-RS patterns 0, 2, and 4 are designed such that the CSI-RSs are arranged in different positions.

In a case where the CSI-RS patterns are grouped into g groups and assigned according to the cell ID, the CSI-RS pattern assignment can be determined as follows. The cell ID of the cell assigned the CSI-RS pattern of group g is NCell_ID, and group g has Ng CSI-RS patterns, the CSI-RS pattern of the corresponding cell is determined by Equation (2).

$$\text{CSI\_RS Pattern ID of group } g = \text{NCell\_ID mod } Ng \qquad \text{Equation (2)}$$

In Equation (2), 'CSI_RS Pattern ID of group g' is obtained by grouping $N_g$ CSI–RS patterns into the group g and then assigning indices from 0 to $N_g-1$ to the CSI-RS patterns. For example, if the group g includes the CSI-RS patterns 0, 2, and 4 of FIG. 9, the CSI-RS pattern IDs of CSI-RS patterns included in the group g become 0, 1, and 2.

Figure 11:
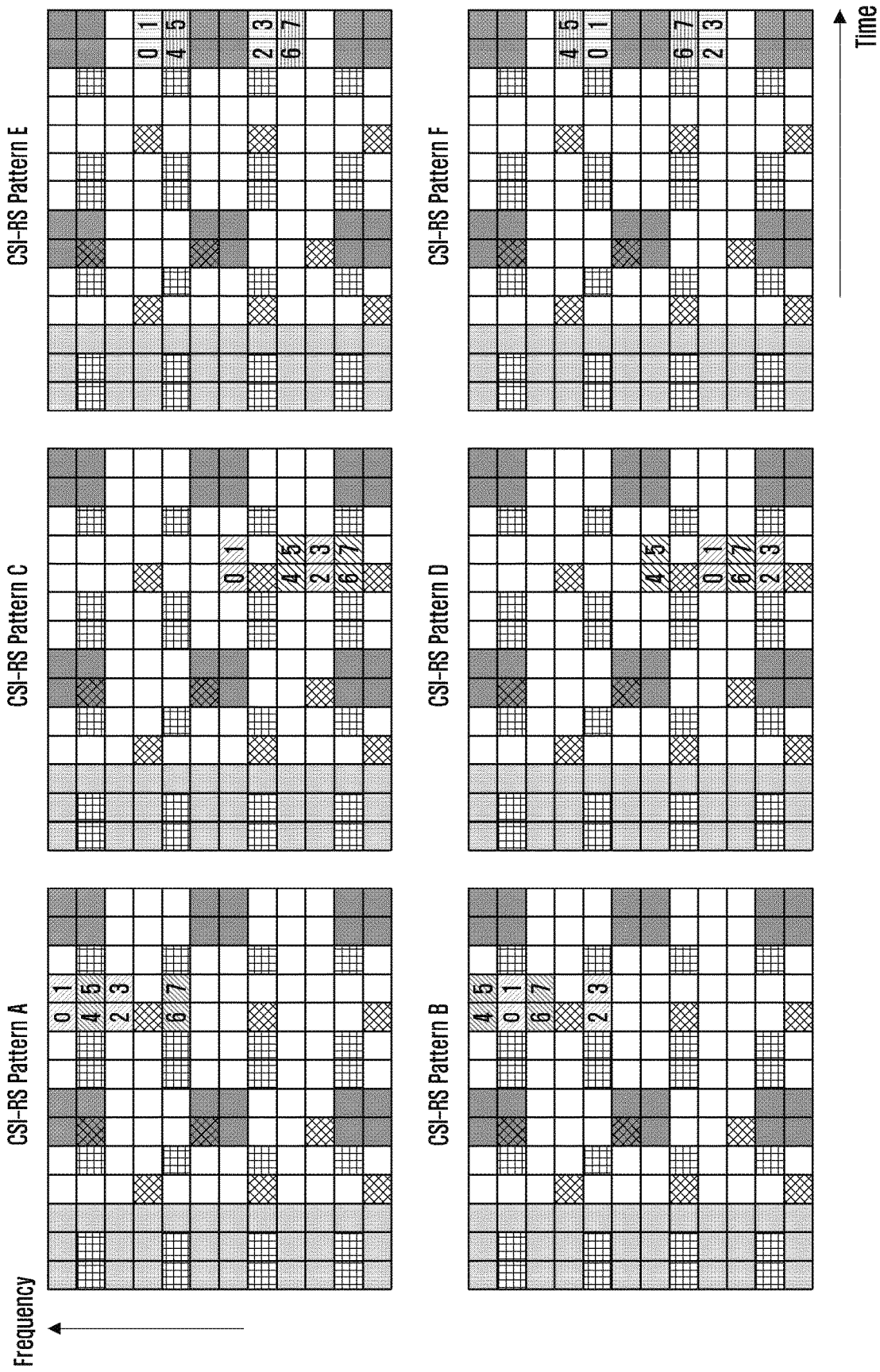
FIG. 11 is a diagram illustrating CSI-RS patterns designed to be assigned to a plurality of cells in a mobile communication system according to an exemplary embodiment of the present invention.

FIG. 11 is a diagram illustrating CSI-RS patterns designed to be assigned to a plurality of cells in a mobile communication system according to an exemplary embodiment of the present invention.

The CSI-RS patterns depicted in FIG. 11 are used to transmit the CSI-RSs of a plurality antenna ports in multiple OFDM symbols and are designed such that the CSI-RSs are transmitted on different resources in the time and the frequency domains. In a case where there are two CSI-RS patterns using the same OFDM symbol, the CSI-RSs of the different antenna ports are alternately allocated the resources different in the frequency domain.

Referring to FIG. 11, the six CSI-RS patterns defined in FIG. 11 are assigned to different cells in a distributed manner to avoid the overlap of the locations for the CSI-RS transmission by as much as possible, as described with reference to FIG. 9. In FIG. 11, CSI-RS pattern 0 is composed of the REs different from those of the CSI-RS patterns 2, 3, 4, and 5. For this reason, even though the transmission powers of the CSI-RSs transmitted by other cells with the CSI-RS patterns 2, 3, 4, and 5 are increased, the UE can measure the channel with the CSI-RS transmitted by the cell using the CSI-RS pattern 0 without additional interference. The reason why the CSI-RS transmitted in the CSI-RS pattern 0 is not interfered by the CSI-RSs transmitted in the CSI-RS patterns 2, 3, 4, and 5 is because the different time and frequency resources are used, and this is achieved regardless of the number of CSI-RS antenna ports. In an exemplary case where CSI-RSs are transmitted for two antenna ports, it is possible to prevent the interference from occurring by transmitting the CSI-RSs at the positions for the antenna ports 0 and 1.

In FIG. 11, the CSI-RS pattern 0 and the CSI-RS pattern 1 may cause interference with each other. In a case where the number of antennas of which CSI-RSs are transmitted in the CSI-RS pattern 0 is equal to or less than 4 and the number of antennas of which CSI-RSs are transmitted in the CSI-RS pattern 1 is equal to or less than 4, the CSI-RSs transmitted in the CSI-RS patterns 0 and 1 do not interfere with each other. Interference occurs either when the number of antennas of which CSI-RSs are transmitted in the CSI-RS pattern 0 is greater than 4 or the number of antennas of which CSI-RSs are transmitted in the CSI-RS pattern 1 is greater than 4. The reason why the interference occurs in some limited cases is because the CSI-RS patterns are designed such that the CSI-RSs alternate in the same OFDM symbol. For example, when using the CSI-RS pattern 0, the CSI-RSs of the antenna ports 0, 4, 2, and 4 are transmitted in the $9^{th}$ OFDM symbol, and the CSI-RSs of the antenna ports 5, 1, 7, and 3 are transmitted in the $10^{th}$ OFDM symbol. Meanwhile, when using the CSI-RS pattern 1, the CSI-RSs of the antenna ports 5, 1, 7, and 3 are transmitted in the $9^{th}$ OFDM symbol, and the CSI-RSs of the antenna ports 0, 2, 4, and 6 are transmitted in the $10^{th}$ OFDM symbol. In this manner, the CSI-RSs of different antenna ports are transmitted in two different OFDM symbols with the CSI-RS pattern 0 and CSI-RS pattern 1 such that the transmission can be performed without interference when the number of antenna ports is equal to or less than 4.

FIGS. 9 and 11 show the CSI-RS patterns available in one PRB that are defined for the transmission of CSI-RSs, and Equations (1) and (2) define the method for assigning the cell IDs to the cells according to exemplary embodiments of the present invention. The CSI-RSs are designed to be adoptable in various operation scenarios in the LTE-A system. One of the significant operation scenarios of the LTE-A system is the heterogeneous network having cells with different sizes of service areas. In the heterogeneous network environment, cells that are relatively small (i.e., a few meters in diagonal) and large (i.e., a few kilometers in diagonal) in size coexist in the same geographical area. In this case, it is required to apply the CSI-RSs differently depending on the type of cell.

In order to provide different CSI-RSs depending on the type of cell, an exemplary embodiment of the present invention proposes a method for dividing one PRB into a plurality of regions and defining a plurality of CSI-RS patterns in each region.

Figure 12:
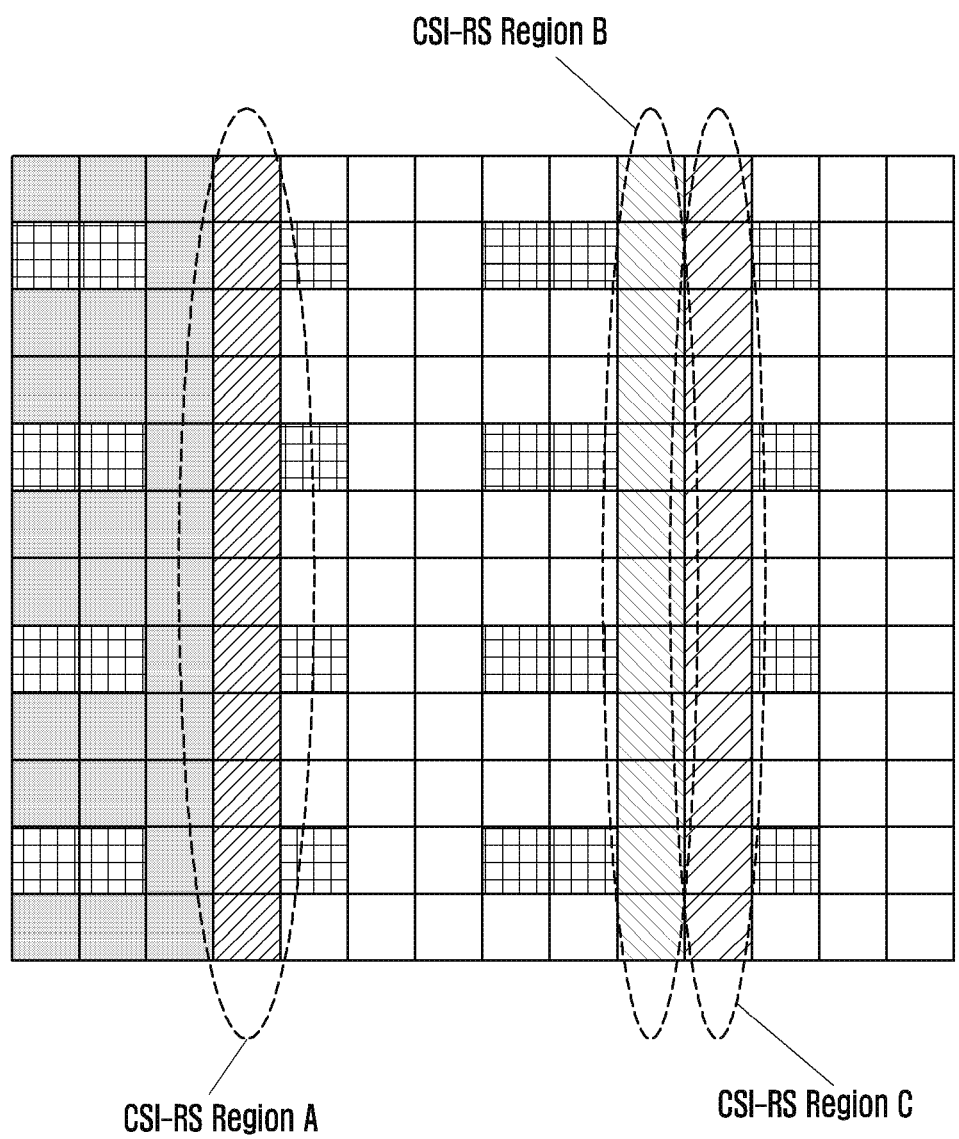
FIG. 12 is a diagram illustrating a PRB in which three CSI-RS regions are defined according to an exemplary embodiment of the present invention.

FIG. 12 is a diagram illustrating a PRB in which three CSI-RS regions are defined according to an exemplary embodiment of the present invention.

Referring to FIG. 12, the CSI-RS region A is used for transmitting the CSI-RSs in the cell small in size, the CSI-RS region B is used for transmitting the CSI-RSs in the cell intermediate in size, and the CSI-RS region C is used for transmitting the CSI-RSs in the cell large in size.

Figure 13:
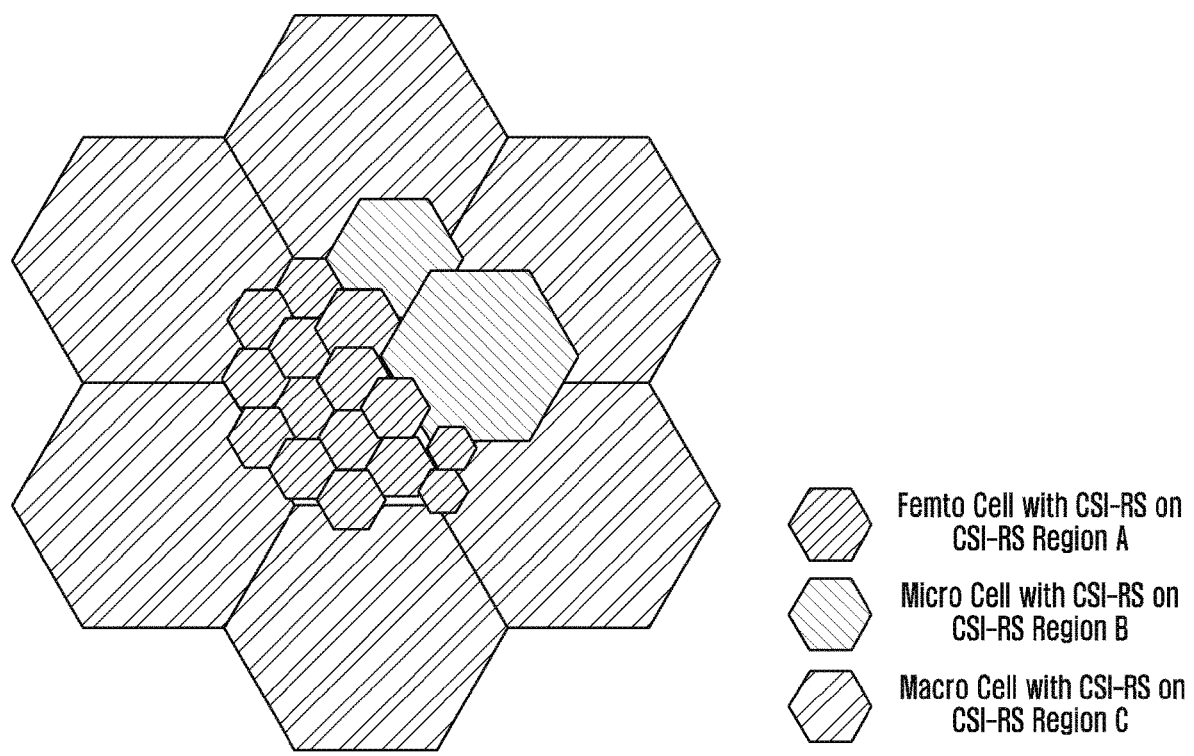
FIG. 13 is a diagram illustrating a principle for transmitting CSI-RSs in a cellular environment including various types of cells according to an exemplary embodiment of the present invention.

FIG. 13 is a diagram illustrating a principle for transmitting CSI-RSs in a cellular environment including various types of cells according to an exemplary embodiment of the present invention. Referring to FIG. 13, it is shown that different types of CSI-RSs are assigned to cells depending on the cell size. The reason why the resource is divided into a plurality of CSI-RS regions which are assigned depending on the characteristic of the cell is to manage the CSI-RS resources efficiently by distributing the same CSI-RS resource to the cells having similar characteristics.

The CSI-RS resource allocation based on the type of the cell as shown in FIG. 13 can be performed as follows:

1. The eNB divides the given CSI-RS transmission resource into a plurality of CSI-RS regions.
2. The eNB determines the type of cells to which each CSI-RS region is assigned.
3. The eNB determines the type of the corresponding cell (e.g., Femto, Micro, and Macro).
4. The eNB determines the CSI-RS pattern to be used in the CSI-RS region based on the type of cell and allocates the CSI-RS pattern to the cell.

Here, the CSI-RS resource allocation can be performed in association with the CSI-RS patterns depicted in FIGS. 9 and 11. For example, when the last two OFDM symbols are defined as CSI-RS region A and the rest as CSI-RS region B in FIG. 11, the CSI-RS pattern E and CSI-RS pattern F are assigned only to the cells classified so as to use the CSI-RS region A.

Figure 14B:
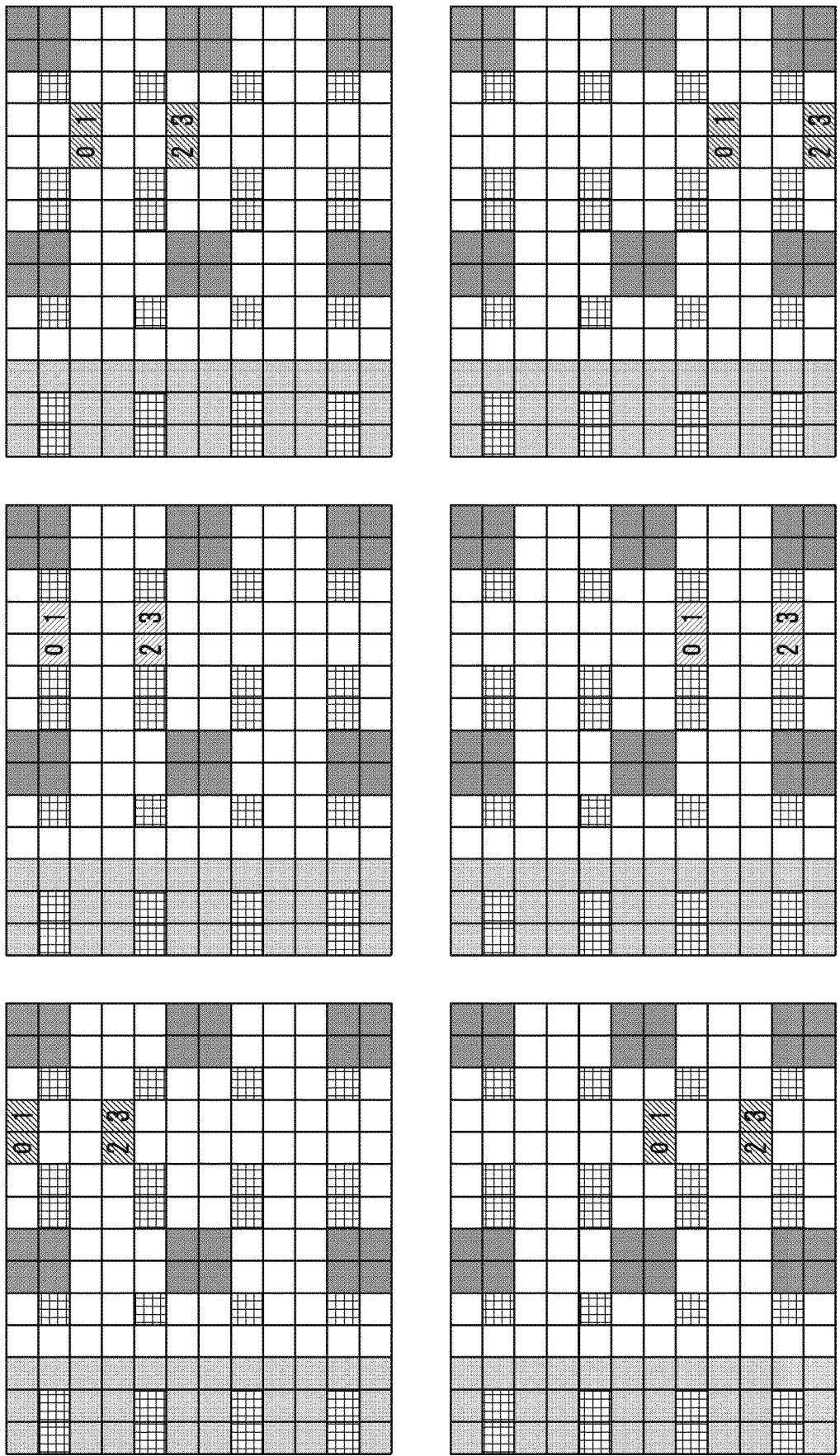
Figure 14C:
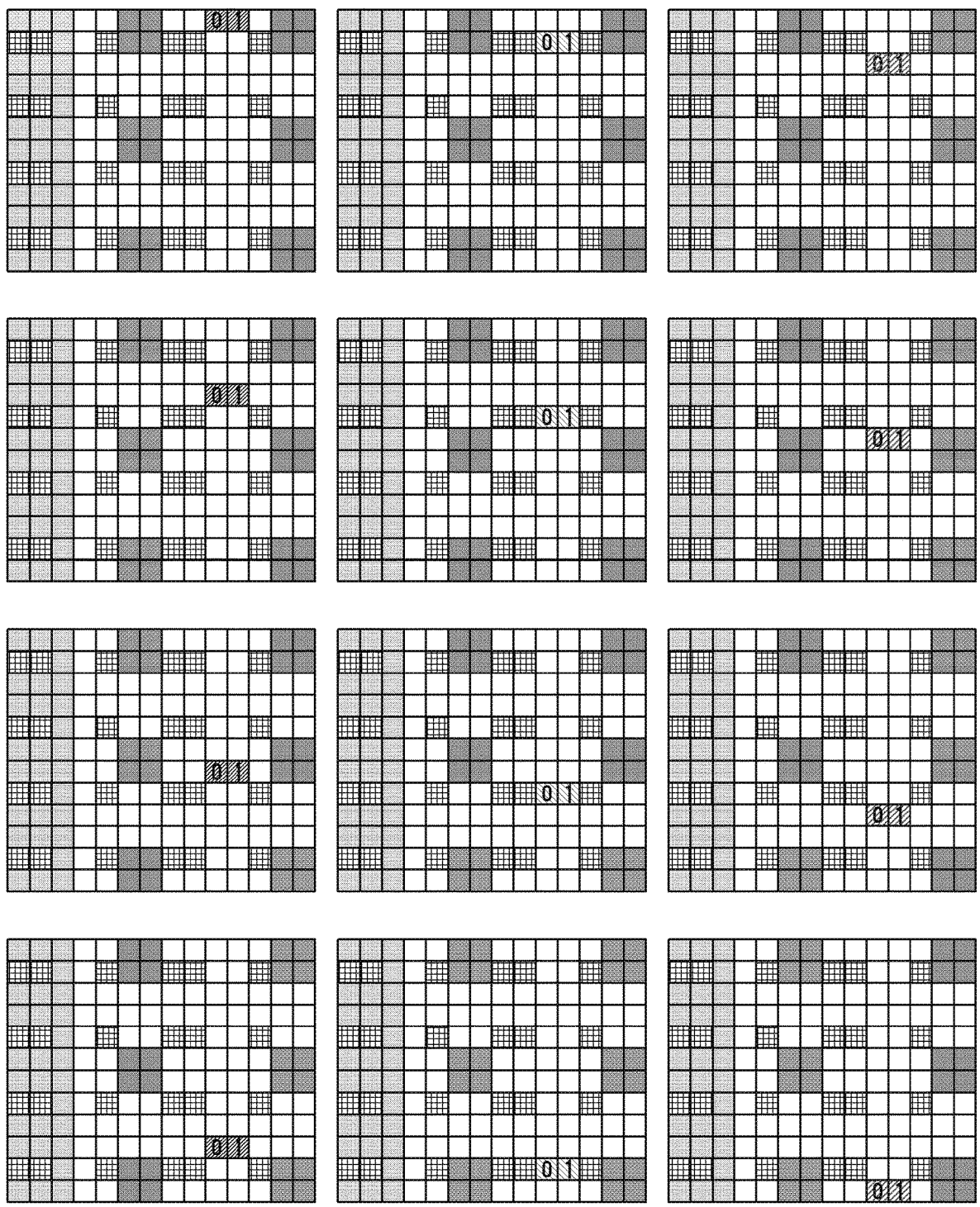

FIGS. 14*a* to 14*c* are diagrams illustrating CSI-RS patterns designed to be assigned to a plurality of cells in a mobile communication system according to an exemplary embodiment of the present invention.

More specifically, FIG. 14*a* shows three CSI-RS patterns designed having CSI-RS transmission positions without overlapping for supporting eight CSI-RS antenna ports. FIG. 14*b* shows six CSI-RS patterns designed having CSI-RS transmission positions without overlapping for supporting four CSI-RS antenna ports. FIG. 14*c* shows twelve CSI-RS patterns designed having CSI-RS transmission positions without overlapping for supporting two CSI-RS antenna ports. The CSI-RS patterns depicted in FIGS. 14*a* to 14*c* are characterized in that the number of available CSI-RS patterns increases as the number of CSI-RS antenna ports decreases.

Referring to FIGS. 14a to 14c, the number of available CSI-RS patterns varies depending on the number of antenna ports. In this case, the method for determining the CSI-RS for each cell varies. In an exemplary case where the number of antenna ports is eight or four as shown in FIG. 9 or FIG. 11 and six CSI-RS patterns are defined, it is possible to determine the CSI-RS pattern ID using Equation (1) regardless of the number of antenna ports. When the number of antennas is eight, four, and two as shown in FIGS. 14a to 14c, three, six, and twelve CSI-RS patterns are defined, respectively. In this case, the CSI-RS pattern is determined as follows:

Step 1. The eNB notifies the UE of the number of CSI-RS antennas of the connected cell.

Step 2. The UE determines the CSI-RS pattern that can support the number of CSI-RS antennas using Equation (3).

$$\text{CSI\_RS Pattern ID} = N\text{Cell\_ID mod} NA \qquad \text{Equation (3)}$$

In Equation (3), the value of NA varies depending on the number of CSI-RS antenna ports. The value of NA is 12 when the number of CSI-RS antennas is 2, 6 when the number of CSI-RS antennas is 4, and 3 when the number of CSI-RS antennas is 8.

In order to determine the CSI-RS pattern using Equation (3), the eNB and UE have to share information and, in this case, the UE can determine the CSI-RS pattern to use based on the number of CSI-RS ports that is notified by the eNB. This method can be applied to the NA having a value and typically when the NA is identical according to the number of CSI-RS antenna ports.

Figure 15:
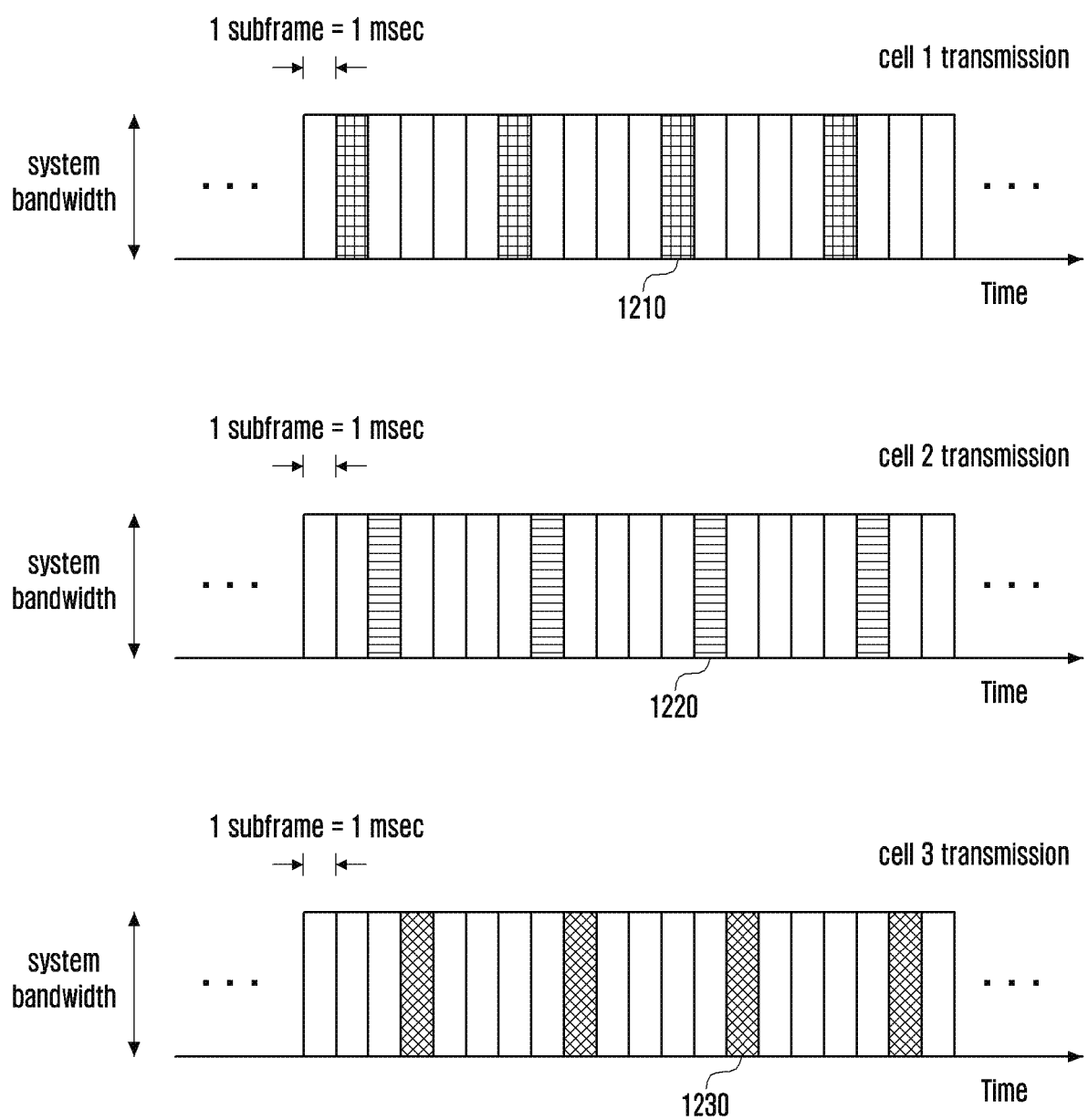
FIG. 15 is a diagram illustrating a principle for transmitting the CSI-RSs in a plurality of cells without interference according to an exemplary embodiment of the present invention.

FIG. 15 is a diagram illustrating a principle for transmitting CSI-RSs in a plurality of cells without interference according to an exemplary embodiment of the present invention.

Referring to FIG. 15, the CSI-RSs are transmitted in different subframes with different time offset values in respective cells. The time offset of the CSI-RS transmitted by each cell can be shared between the eNB and UE with one of two methods. First, the eNB determines the time offset value per cell in advance and transmits the time offset value in the form of control information through higher layer signaling. Second, the eNB and UE generates the time offset value using a previously negotiated method.

In FIG. 15, the eNB of cell 1 transmits a CSI-RS in a subframe 1210, the eNB of cell 2 transmits a CSI-RS in a subframe 1220, and the eNB of cell 3 transmits a CSI-RS in a subframe 1230.

It is advantageous for the multiple cells to transmit the CSI-RSs with the time offset value of different subframes since the CSI-RSs transmitted by the different cells do not interfere with each other. In a case of LTE and LTE-A systems operating in a Time Division Duplex (TDD) mode, however, it can be limited to use the subframe for downlink transmission in the radio frame composed of 10 subframes. In this case, the CSI-RS must be transmitted in some specific subframes and as a consequence it becomes difficult to sufficiently distribute the CSI-RSs transmitted by a plurality of cells in a unit of a subframe. In a case where the CSI-RSs are not distributed sufficiently in a unit of a subframe, it is possible to reduce the interference between the CSI-RSs transmitted in the plural cells by assigning the CSI-RS patterns, as shown in FIG. 11, to the cells. This means that the CSI-RSs of the different cells are transmitted in different CSI-RS patterns in the same subframe.

FIG. 16 is a diagram illustrating a principle for transmitting CSI-RSs of multiple cells with different CSI-RS patterns in a subframe according to an exemplary embodiment of the present invention.

Referring to FIG. 16, cell 1 transmits the CSI-RSs in the subframes denoted by reference number 1320, but not in the subframes denoted by reference number 1330. Cell 2 transmits the CSI-RSs in the subframes denoted by reference number 1350 that are identical with those in which cell 1 transmits its CSI-RSs, but not in the subframes denoted by reference number 1360. In FIG. 16, cell 2 transmits the CSI-RSs in the same subframe as cell 1 does but the CSI-RS pattern used by cell 2 (i.e., the CSI-RS pattern denoted by reference number 1340) differs from the CSI-RS pattern used by cell 1 (i.e., the CSI-RS pattern denoted by reference number 1310), thereby avoiding interference between CSI-RSs.

In the LTE-A system, the CSI-RS is used to measure the state of the downlink channel of the cell to which the UE belongs. The UE measures the downlink channel of the corresponding cell using the CSI-RS transmitted by one cell, but it is also possible for the UE to measure the downlink channels using the CSI-RSs transmitted by two or more cells. Measurement of the downlink channels of the CSI-RSs transmitted by multiple cells can be performed when the UE receives signals in a Coordinated Multi Point (CoMP) transmission scheme. In a case of CoMP transmission, multiple eNBs cooperate for transmission to a single UE. At this time, the eNBs perform precoding in consideration of the precoding of other eNBs and transmit signals to the UE simultaneously.

In order for the multiple eNBs to support the CoMP transmission to a single UE, the UE must have the capacity to measure the channel states of the eNBs to be involved to the CoMP transmission. That is, the UE can measure the CSI-RSs of the multiple cells and transmit the measurement results to the corresponding eNBs. An exemplary embodiment of the present invention proposes a novel CSI-RS transmission method for CoMP transmission. The CSI-RS transmission method for CoMP according to an exemplary embodiment of the present invention is characterized by transmitting the CoMP CSI-RS and non-CoMP CSI-RS in different time points. That is, the CSI-RSs of individual cells are distinguished between CoMP CSI-RS and non-CoMP CSI-RS according to the subframe carrying the CSI-RSs.

Figure 17:
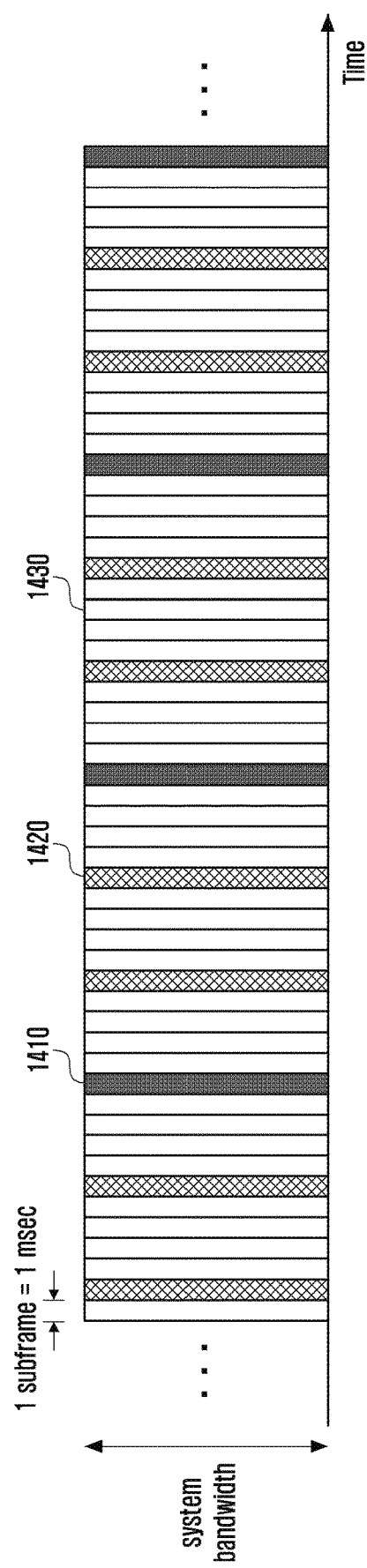
FIG. 17 is a diagram illustrating a principle for transmitting Coordinated Multi Point (CoMP) CSI-RS and non-CoMP CSI-RS in a cell of a mobile communication system according to an exemplary embodiment of the present invention.

FIG. 17 is a diagram illustrating a principle for transmitting CoMP CSI-RS and non-CoMP CSI-RS in a cell of a mobile communication system according to an exemplary embodiment of the present invention.

In FIG. 17, the non-CoMP CSI-RS or the CoMP CSI-RS is transmitted at a first time interval, the CoMP CSI-RS are transmitted once within a second time interval and the non-CoMP CSI-RSs are transmitted at the first time interval. Here, the first time interval can be the time duration corresponding to 5 subframes, and the second time interval can be the time duration corresponding to 15 subframes.

Referring to FIG. 17, the non-CoMP CSI-RS is transmitted in the subframes patterns as denoted by reference number 1420, and the CoMP CSI-RS is transmitted in the subframes colored as denoted by reference number 1410. In the subframes that are not marked, such as the subframes denoted by reference number 1430, no CSI-RS is transmitted. In the exemplary structure of FIG. 17, the CSI-RS is transmitted at every 5 msec among the CSI-RSs transmitted at every 5 msec, the CoMP CSI-RS is transmitted at every 15 msec, and the rest CSI-RSs are non-CSI-RSs. In order to transmit the CoMP CSI-RSs and the non-CoMP CSI-RSs as shown in FIG. 17, the subframes to carry the CSI-RSs should be determined and assigned the subframes for carrying the CoMP CSI-RS and the non-CoMP CSI-RS. The method for transmitting the CoMP CSI-RSs and non-CoMP CSI-RSs as described with reference to FIG. 17 is advantageous to transmit the CoMP CSI-RSs and non-CoMP CSI-RSs with the radio resources constantly allocated for the CSI-RS transmission.

In order to transmit the CoMP CSI-RS and non-CoMP CSI-RS as shown in FIG. 17, the eNB notifies the UE of the CSI-RS transmission interval and the rule for distinguishing between the subframe carrying the CoMP CSI-RS and the subframe carrying the non-CoMP CSI-RS.

Figure 18:
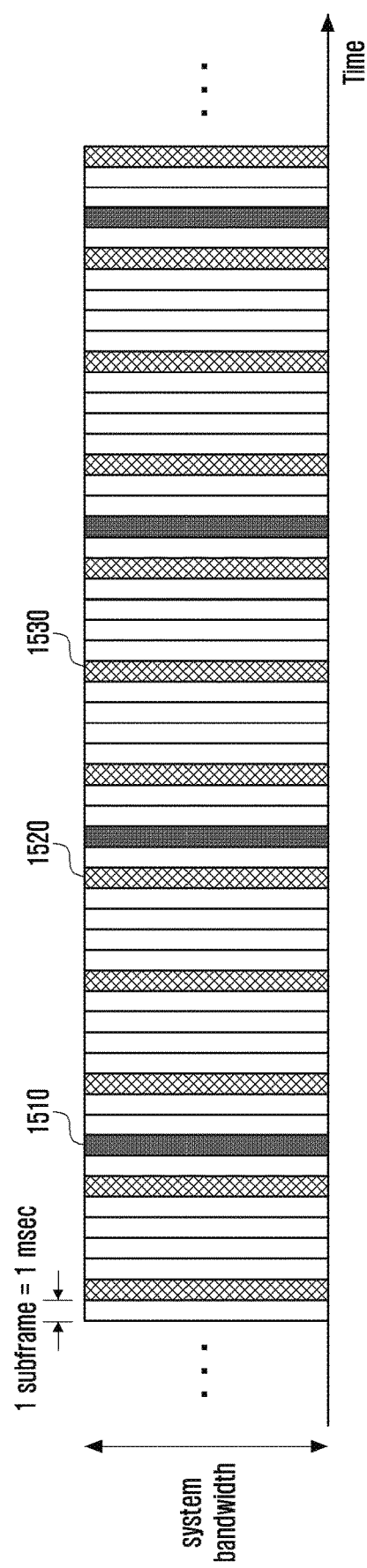
FIG. 18 is a diagram illustrating a principle for transmitting CoMP CSI-RS and non-CoMP CSI-RS in a cell of a mobile communication system according to an exemplary embodiment of the present invention.

FIG. 18 is a diagram illustrating a principle for transmitting CoMP CSI-RS and non-CoMP CSI-RS in a cell of a mobile communication system according to an exemplary embodiment of the present invention.

Referring to FIG. 18, the non-CoMP CSI-RS is transmitted at a first time interval, and the CoMP CSI-RS at a second time interval, the second time interval being greater than the first time interval. Here, the first time interval is equal to 5 subframe durations, and the second time interval is equal to 15 subframe durations.

As shown in FIG. 18, the non-CoMP CSI-RS is transmitted in the subframes patterned as denoted by reference number 1520, and the CoMP CSI-RS is transmitted in the subframes colored as denoted by reference number 1510. In the subframes that are not marked, such as the subframes denoted by reference number 1530, no CSI-RS is transmitted. In FIG. 18, it is shown that the time durations for transmitting the CoMP CSI-RS and the non-CoMP CSI-RS are separately provided. Unlike the method of FIG. 17, which determines the time durations for transmitting the CSI-RS first and then allocates the determined time durations for transmitting the CoMP CSI-RS and non-CoMP CSI-RS, the method of FIG. 18 determines the time durations for transmitting the CoMP CSI-RS and non-CoMP CSI-RS separately. As a consequence, the CoMP CSI-RS is transmitted at every 15 msec, and the non-CoMP CSI-RS at every 5 msec in FIG. 18.

FIGS. 17 and 18 show the methods for transmitting the CoMP CSI-RS and non-CoMP CSI-RS at predetermined transmission time durations in a cell. It is determined which type of CSI-RS is transmitted in which subframe. In addition, how to generate the CoMP CSI-RS is important.

The CoMP CSI-RS proposed in an exemplary embodiment of the present invention is transmitted in a different manner as compared to the non-CoMP CSI-RS. That is, the eNB generates different signals depending on whether the CSI-RS to be transmitted in the cell is a CoMP CSI-RS. The CoMP CSI-RS proposed in an exemplary embodiment of the present invention is transmitted using a smaller number of virtual antenna ports as compared to the non-CoMP CSI-RS. Antenna virtualization refers to transmitting, when N physical antennas exist, the same signal such that the signal is shown as if being transmitted by M antennas. For example, if a signal is transmitted by two antennas at the transmission powers P1 and P2, the signal is received by the receiver as if being transmitted by one transmit antenna at the transmission power of P1+P2.

Figure 19:
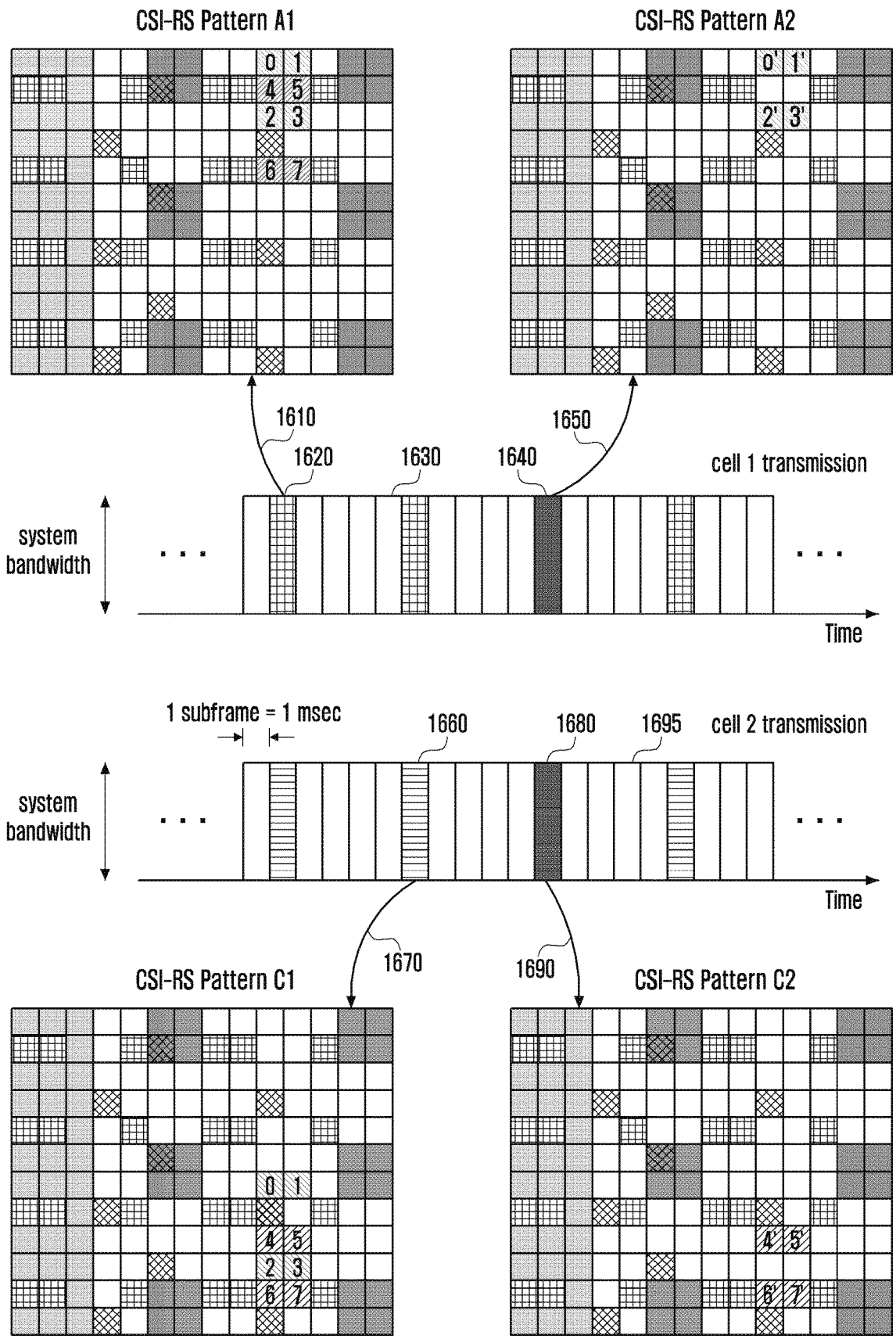
FIG. 19 is a diagram illustrating a principle for transmitting CoMP CSI-RS and non-CoMP CSI-RS in a mobile communication system according to an exemplary embodiment of the present invention.

FIG. 19 is a diagram illustrating a principle for transmitting CoMP CSI-RS and non-CoMP CSI-RS in a mobile communication system according to an exemplary embodiment of the present invention. FIG. 19 is depicted under the assumption that two cells are transmitting CSI-RSs.

Referring to FIG. 19, the subframe patterned as denoted by reference number 1620 carries the non-CoMP CSI-RS transmitted by cell 1, the subframe colored as denoted by reference number 1640 carries the CoMP CSI-RS transmitted by cell 1, and the subframe not marked as denoted by reference number 1630 carries no CSI-RS. The subframe patterned as denoted by reference number 1660 carries the non-CoMP CSI-RS transmitted by cell 2, the subframe colored as denoted by reference number 1680 carries the CoMP CSI-RS transmitted by cell 2, and the subframe not marked as denoted by reference number 1695 carries no CSI-RS.

In FIG. 19, the subframe for transmitting the non-CoMP CSI-RS carries the CSI-RSs arranged as denoted by reference numbers 1610 and 1670 that are transmitted by cell 1 and cell 2. The CSI-RS patterns for transmitting the non-CoMP CSI-RS in the subframes denoted by reference numbers 1610 and 1670 are ones of the six CSI-RS patterns depicted in FIG. 11. In a case where the non-CoMP CSI-RS is transmitted, each cell transmits the CSI-RS which is capable of channel measurement to all antenna ports. Otherwise, in a case where the CoMP CSI-RS is transmitted as denoted by reference numbers 1650 and 1690 of FIG. 19, each cell transmits the CSI-RS of the reduced number of antenna ports. The method for reducing the number of antenna ports of the CSI-RSs transmitted, as denoted by reference number 1650 and 1690 of FIG. 19, can be performed using the aforementioned antenna virtualization. In a case of transmitting the CoMP CSI-RS in this manner, the number of antenna ports of CSI-RS is reduced and thus the number of antenna ports of CSI-RSs transmitted by each cell decreases, but the transmission power of each antenna increases. That is, in a case denoted by reference numbers 1650 and 1690 of FIG. 19, the CoMP CSI-RS is transmitted at a transmission power that is twice that of the non-CSI-RS.

The reason why the CoMP CSI-RS is transmitted as shown in FIG. 19 is to improve the reception performance of the UEs having bad received signal strength at a cell edge. That is, if the cells transmit the CoMP CSI-RS, it is possible to reduce the number of antenna ports of each cell which the UE would measure and increase the transmission power at each antenna port, resulting in an improvement of the reception performance of UE. In a case where the UEs are located at the cell edge, it is advantageous to increase the received signal strength of each layer rather than to increase the spatial multiplexing gain with an increase in the number of layers. In a case of transmitting the CoMP CSI-RS separately, as shown in FIG. 19, without reducing the antenna ports, the UE receives a number of CSI-RSs corresponding to the number of cells involved in the CoMP. That is, assuming that the UE receives signals from cell 1 and cell 2 in CoMP, the UE must measure a total of 16 antenna ports and feed back the channel measurement information to the eNB. In the situation where the large number of layers is not advantageous for receiving signal, it is inefficient to perform channel measurement on the increased number of antenna ports to the non-CoMP and report a relatively large amount of channel measurement information.

In a case where the CSI-RSs are transmitted by multiple cells, it is possible to avoid the collision between the CSI-RSs of different cells with multiple CSI-RS patterns as depicted in FIGS. 9 and 11. Another method for improving the CSI-RS reception performance is to use muting or blanking. Muting refers to not transmitting a signal at a specific RE position. That is, at the REs on which cell 1 transmits the CSI-RS, cell 2 does not transmit any signal in order for the UE to measure the CSI-RS transmitted by cell 1 more accurately.

Figure 20:
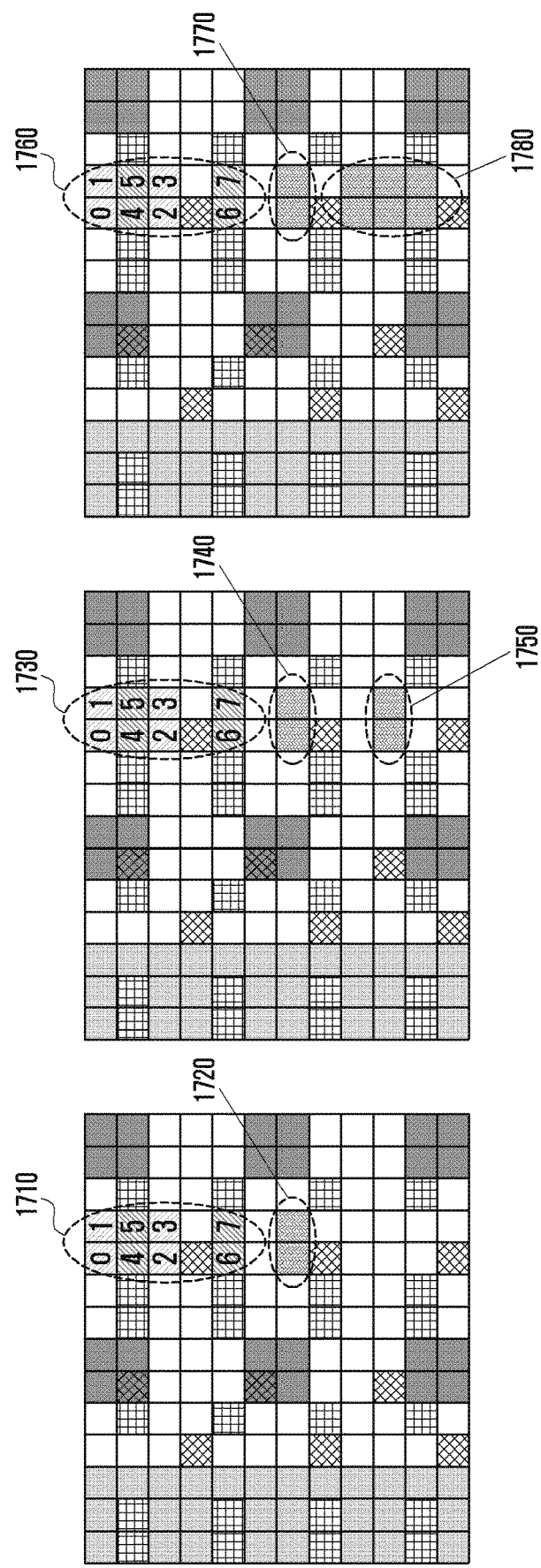
FIG. 20 is a diagram illustrating a principle of transmitting CSI-RS with a muting scheme in a mobile communication system according to an exemplary embodiment of the present invention.

FIG. 20 is a diagram illustrating a principle of transmitting CSI-RS with a muting scheme in a mobile communication system according to an exemplary embodiment of the present invention.

Referring to FIG. 20, multiple cells transmit CSI-RSs in different CSI-RS patterns, and each cell determines the CSI-RS patterns used by neighbor cells and mutes the resources on which the neighbor cells transmit their CSI-RSs.

FIG. 20 is depicted under the assumption that cell 1 transmits CSI-RSs in the CSI-RS pattern A of FIG. 11, and cell 2, which is adjacent to cell 1, transmits CSI-RSs in the CSI-RS pattern C of FIG. 11. In this case, the CSI-RS pattern of cell 1 has the instances as denoted by reference numbers 1710, 1730, and 1760. The CSI-RSs are transmitted at the REs assigned to the corresponding antenna ports according to a number of CSI-RS antenna ports of cell 1. In a case where cell 2 transmits the CSI-RSs in the CSI-RS pattern C of FIG. 11, the signals transmitted by cell 1 are muted according to the number of CSI-RS antenna ports of cell 2. If the number of CSI-RS antenna ports of cell 2 is 2, cell 1 performs muting on the resources denoted by reference number 1720 to help the channel measurement based on the CSI-RS of cell 2. If the number of the CSI-RS antenna ports of cell 2 is 4, cell 1 performs muting on the resources denoted by reference numbers 1740 and 1750. Also, if the number of the CSI-RS antenna ports of cell 2 is 8, the cell performs muting on the resources as denoted by reference numbers 1770 and 1780.

Figure 21:
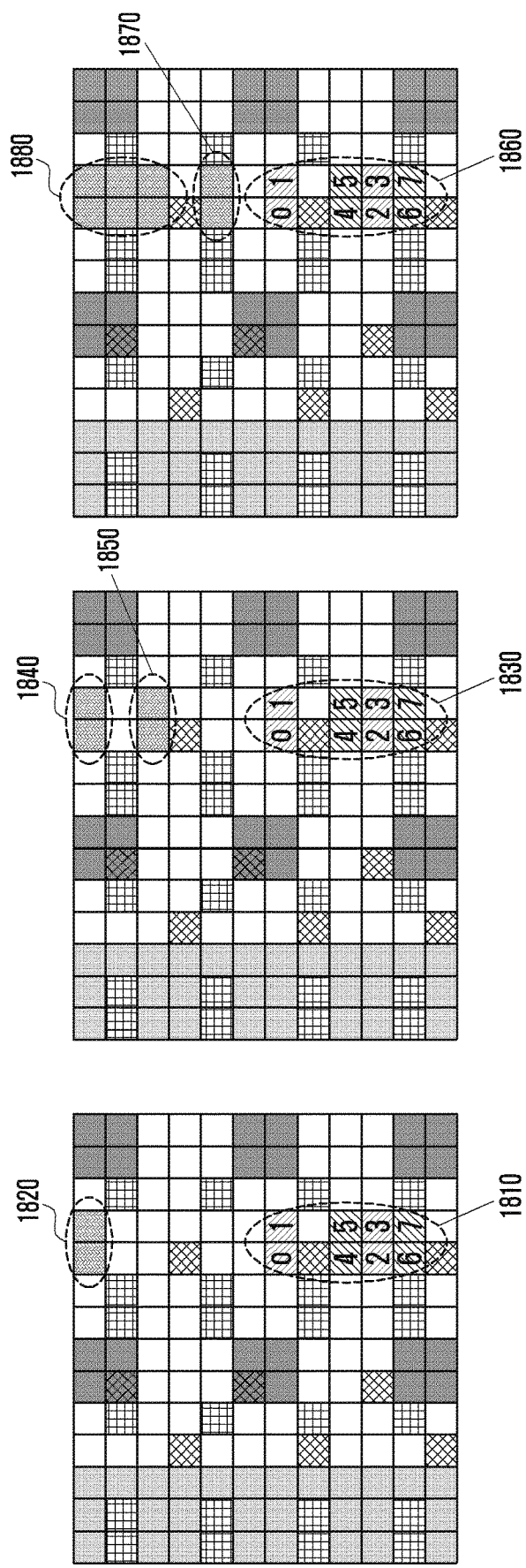
FIG. 21 is a diagram illustrating a principle of transmitting CSI-RS with a muting scheme in a mobile communication according to an exemplary embodiment of the present invention.

FIG. 21 is a diagram illustrating a principle of transmitting CSI-RS with a muting scheme in a mobile communication according to an exemplary embodiment of the present invention. FIG. 21 shows the resources on which cell 2 performs muting when cell 1 transmits CSI-RS.

Referring to FIG. 21, cell 1 transmits CSI-RSs, and cell 2 performs muting at the resources carrying the CSI-RS of cell 1 to help channel measurement base on the CSI-RS of cell 2. Also, cell 2 transmits CSI-RS and, on the resources carrying the CSI-RS of cell 1, performs muting to help channel measurement based on the CSI-RS of cell 1. Herein, reference numbers 1810, 1820, 1830, 1840, 1850, 1860 and 1870 are similar to reference numbers 1710, 1720, 1730, 1740, 1750, 1760 and 1770 of FIG. 20 and therefore their description will be omitted herein for conciseness in explanation.

As shown in FIGS. 20 and 21, when multiple cells transmit CSI-RSs, each cell performs muting on the REs carrying the CSI-RS of the other cells to help the UE estimate channels based on the CSI-RSs of the other cells. In order to adopt the muting scheme, the cells must share the information on the CSI-RS patterns. That is, in order to perform muting transmission of CSI-RS, the eNB transmitting the CSI-RS to a specific cell as shown in FIG. 20 should know the information on the CSI-RS patterns used by the eNB transmitting the CSI-RS as shown in FIG. 21 and the number of antenna ports of which CSI-RS are transmitted. In a case of adopting the muting scheme as shown in FIG. 21 to the CSI-RS transmission as shown in FIG. 17, the involved cells must share their CSI-RS patterns and numbers of CSI-RS antenna ports.

FIGS. 20 and 21 show the muting scheme performed in the subframe in which the CSI-RS are transmitted. However, the muting scheme can be used in the subframe in which no CSI-RS exists, in the same manner. Also, the muting scheme is not applied in the subframe in which no CSI-RS of other cells exist, but partially in such a subframe.

Figure 22:
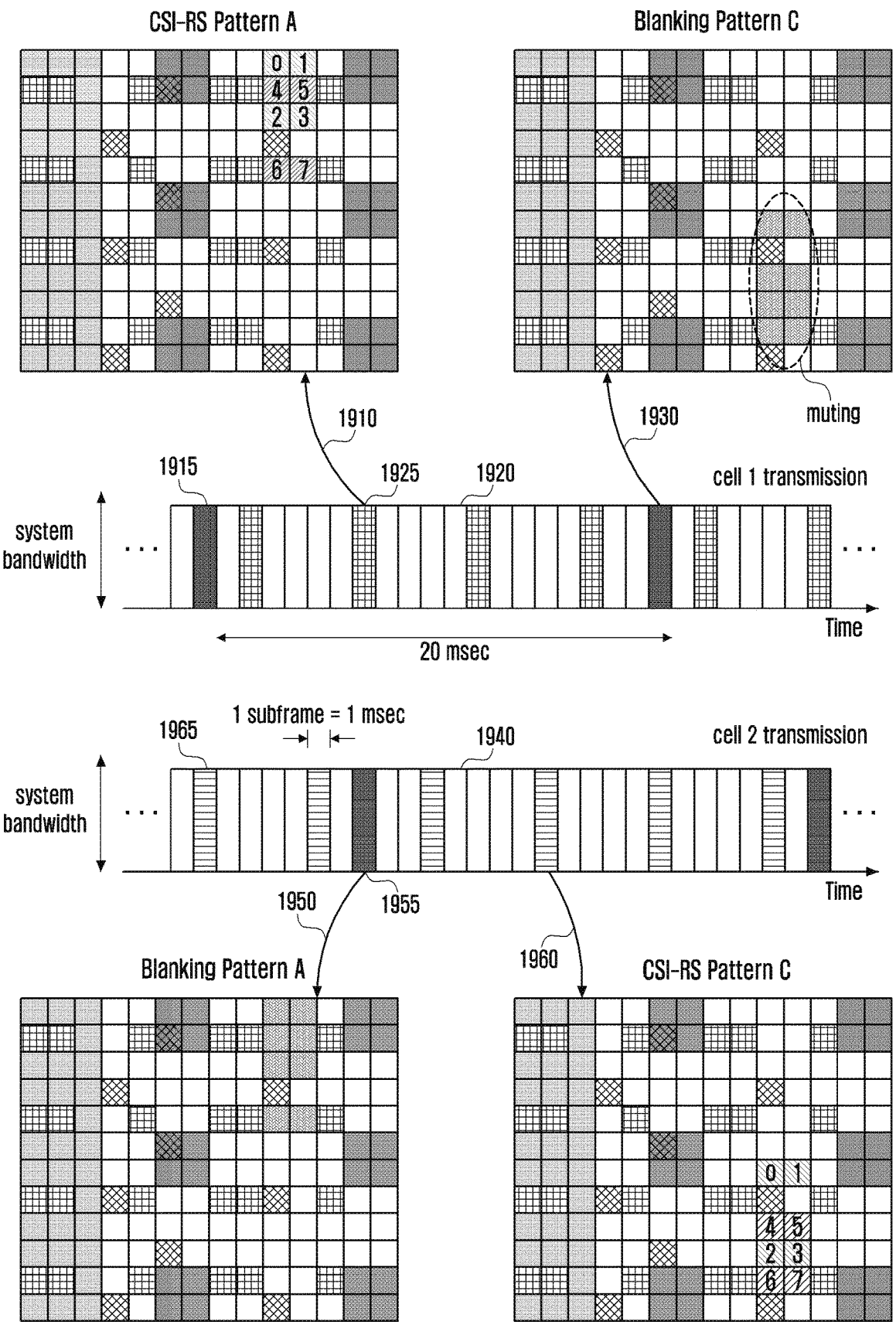
FIG. 22 is a diagram illustrating a principle for applying a muting scheme to a case where multiple cells transmit CSI-RSs with different subframe offsets according to an exemplary embodiment of the present invention.

FIG. 22 is a diagram illustrating a principle for applying a muting scheme to a case where multiple cells transmit CSI-RSs with different subframe offsets according to an exemplary embodiment of the present invention.

Referring to FIG. 22, two cells are transmitting CSI-RSs, and the CSI-RSs of the respective cells are transmitted with different subframe offsets. The muting scheme is determined depending on the transmission pattern of CSI-RSs in the two cells. That is, cell 1 performs muting at the resources denoted by reference number 1930 in the subframe 1915 in FIG. 22. The reason why the signal transmitted by cell 1 is muted in the subframe 1915 is to help the UE measure the CSI-RS transmitted by the cell as denoted by reference number 1965.

In FIG. 22, it is observed that the muting is applied not to the entire resource of the subframe in which the CSI-RSs are transmitted but to a part of the subframe. Applying the muting partially is to reduce the performance degradation of data signal that can occur due to the muting. In FIG. 22, it is also observed that the CSI-RS occurs at every 5 subframes and the muting occurs at every 20 subframes. In order to transmit the CSI-RSs in the manner of FIG. 22, one cell should know the subframe offset and transmission interval of CSI-RS in the other cell.

In FIGS. 20, 21, and 22, the muting scheme is applied under the assumption that the CSI-RSs are transmitted in all the PRBs. However, the muting scheme can be applied to the case where the CSI-RSs are transmitted in only some of the PRBs, in the same manner.

Figure 23:
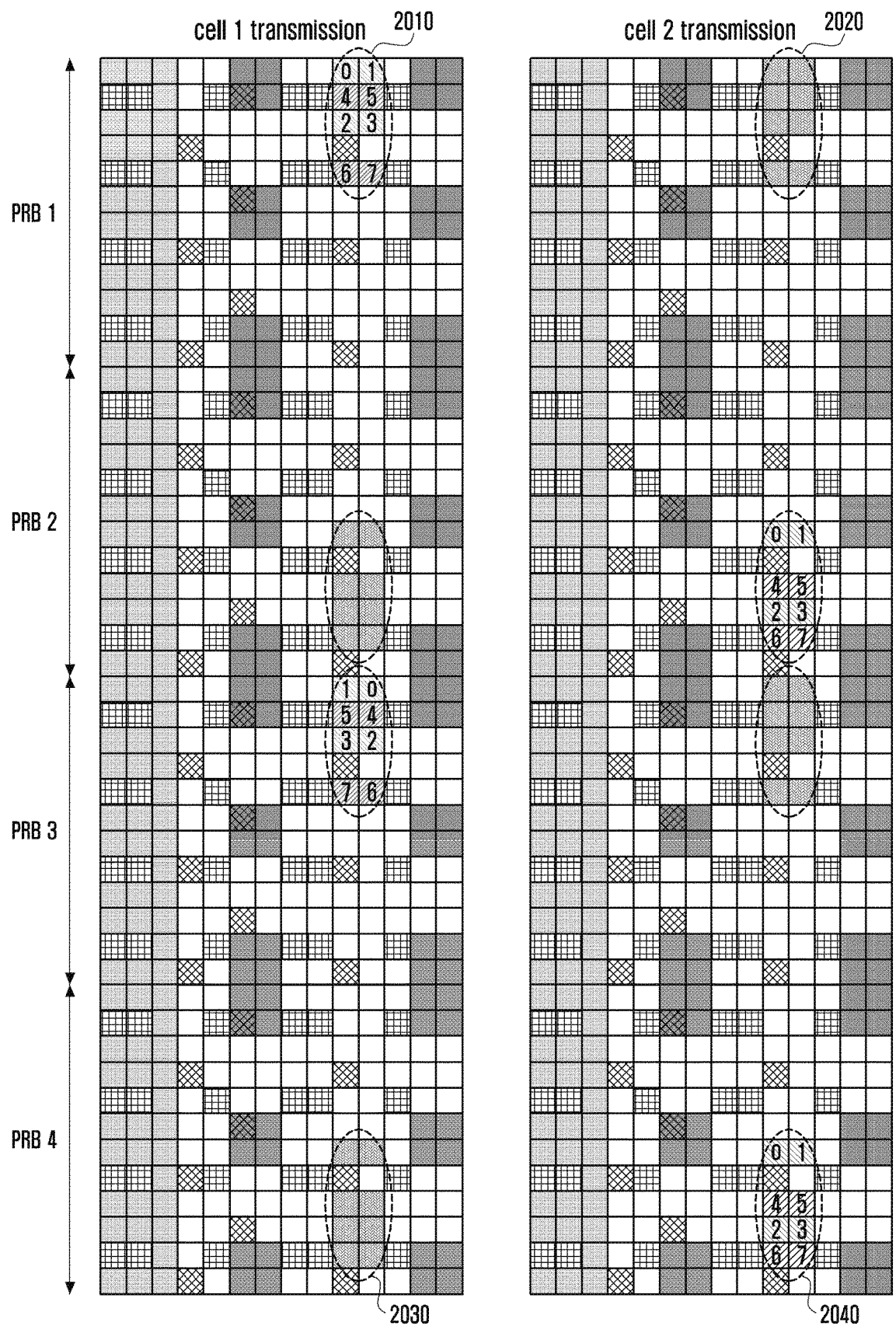
FIG. 23 is a diagram illustrating a principle for applying a muting scheme applied to a case where two cells transmit CSI-RS in some PRBs according to an exemplary embodiment of the present invention.

FIG. 23 is a diagram illustrating a principle for applying a muting scheme applied to a case where two cells transmit CSI-RS in some PRBs according to an exemplary embodiment of the present invention.

Referring to FIG. 23, cell 2 applies muting to the resources as denoted by reference number 2020 while cell 1 transmits CSI-RS on the same resources as denoted by reference number 2010, and cell 1 applies muting to the resources as denoted by reference number 2030 while cell 2 transmits CSI-RS on the same resources as denoted by reference number 2040.

Figure 24:
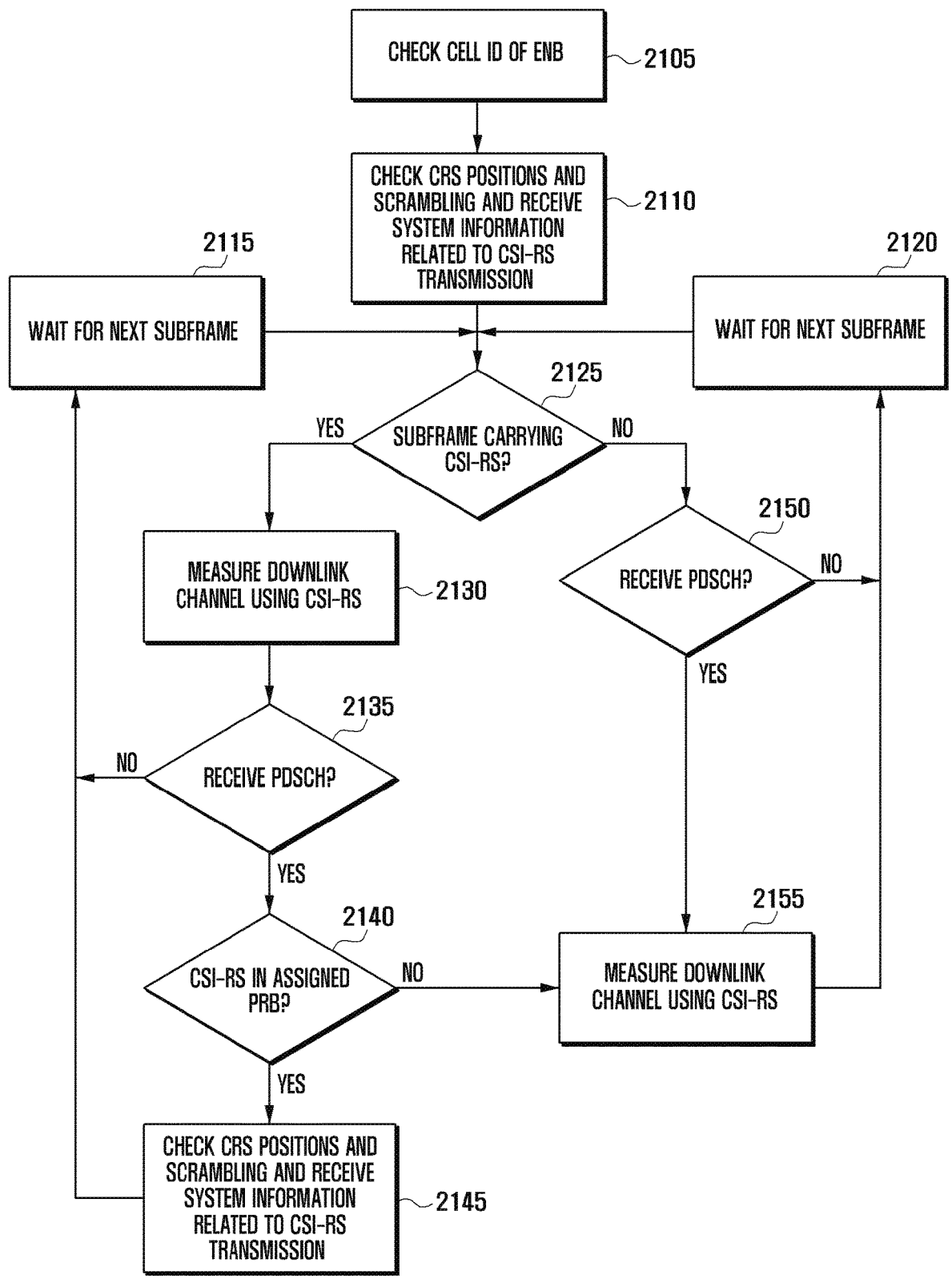
FIG. 24 is a flowchart illustrating a method for a UE to receive CSI-RS in a mobile communication system operating with a plurality of CSI-RS patterns depicted in FIG. 9 or FIG. 11 according to an exemplary embodiment of the present invention.

FIG. 24 is a flowchart illustrating a method for a UE to receive CSI-RS in a mobile communication system operating with a plurality of CSI-RS patterns depicted in FIG. 9 or FIG. 11 according to an exemplary embodiment of the present invention.

Referring to FIG. 24, the UE determines the cell ID of the eNB which performs transmission in the corresponding cell in step 2105, and then determines CRS positions and scrambling and receives the system information related to CSI-RS in step 2110. Here, the cell ID is used for determining the information on the CRS position and scrambling, and the UE obtaining the CRS information can receive the system information of the corresponding cell. The system information received at step 2110 includes control information related to CSI-RS. The UE can receive the control information on the CSI-RS from the eNB directly at step 2110. In a case where the CSI-RS pattern for use in the transmission of CSI-RS of a specific cell is a function of the cell ID as described with reference to FIGS. 9 and 11, the UE determines the cell ID of the corresponding eNB to obtain the system information related to the CSI-RS transmission such as CSI-RS position and scrambling.

Afterward, the UE receives and processes subframes. If a subframe is received, the UE determines whether the subframe is carrying the CSI-RS based on the information obtained at step 2110 in step 2125. If it is determined that the subframe is carrying the CSI-RS, the UE measures a downlink channel state using the CSI-RS in step 2130. Next, the UE determines whether the subframe carries a Physical Downlink Shared Channel (PDSCH) destined to itself in step 2135. If it is determined that the subframe carries the PDSCH, the UE determines whether CSI-RS exists on the frequency resource, i.e., PRB, where the PDCCH is transmitted in step 2140. If a CSI-RS exists in the PRB allocated for transmitting the PDSCH, the UE performs a PDSCH reception operation in consideration of the CSI-RS not existing in the allocated PRB in step 2145 and waits for the next subframe in step 2115.

If it is determined that the subframe does not carry the PDSCH at step 2135, the UE waits for the next subframe in step 2115. Also, if there is no CSI-RS in the PRB allocated for transmitting the PDSCH (i.e., if no subframe carrying a CSI-RS is received) at step 2140, the UE performs the PDSCH reception operation in consideration of the CSI-RS not existing in the allocated PRB in step 2155 and waits for the next subframe in step 2120. If it is determined that the subframe is not carrying the CSI-RS at step 2125, the UE determines whether the subframe is carrying a PDSCH in step 2150 and, if a PDSCH is contained in the subframe, performs the PDSCH reception operation in step 2155 and waits for the next subframe in step 2120. If no PDSCH is contained in the subframe at step 2150, the UE returns the process to step 2120 to wait for the next subframe.

Figure 25:
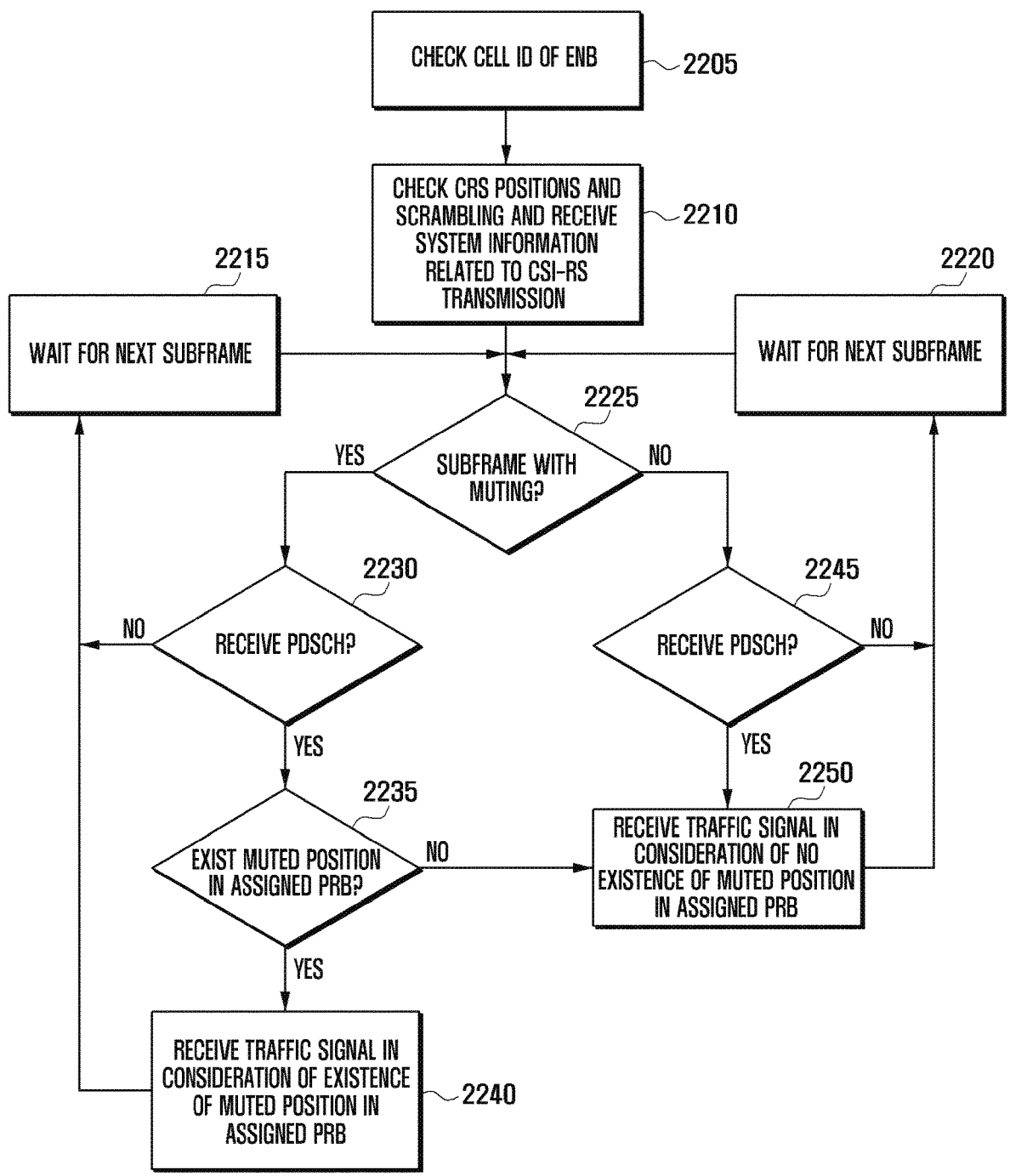
FIG. 25 is a flowchart illustrating a method for a UE to receive CSI-RS in a mobile communication system operating with a plurality of CSI-RS patterns depicted in FIG. 9 or FIG. 11 with a muting scheme according to an exemplary embodiment of the present invention.

FIG. 25 is a flowchart illustrating a method for a UE to receive CSI-RS in a mobile communication system operating with a plurality of CSI-RS patterns depicted in FIG. 9 or FIG. 11 with a muting scheme according to an exemplary embodiment of the present invention.

Referring to FIG. 25, the UE determines the cell ID of the eNB which performs transmission in the corresponding cell in step 2205, and then determines CRS positions and scrambling and receives the system information related to CSI-RS in step 2210. Here, the cell ID is used for determining the information on the CRS position and scrambling, and the UE obtaining the CRS information can receive the system information of the corresponding cell. The system information received at step 2210 includes control information related to CSI-RS. The UE can receive the control information on the CSI-RS from the eNB directly at step 2210. The control information which the UE has received from the eNB includes the muting position of the eNB as well as the information on the CSI-RS of the cell to which the UE belongs. Muting can be performed in two manners. In the first manner, the eNB notifies the UE of the muting positions directly, and in the second manner, the eNB notifies the UE of the CSI-RS pattern to which muting is applied. In a case where there are a plurality of CSI-RS patterns defined between the eNB and UE, the eNB needs only to notify the UE of which CSI-RS pattern is used for muting. Here, the muting control information transmitted from the eNB to the UE includes the corresponding CSI-RS pattern, number of antennas to be muted, muting interval, subframe offset of muting, etc.

After determining the muting control information at step 2210, the UE receives a subframe and determines whether the subframe is supposed to be muted in step 2225. If it is determined that the subframe is supposed to be muted, the UE determines whether the subframe carries a PDSCH destined for itself in step 2230. If the subframe carries the PDSCH, the UE determines whether the PRB allocated to the UE has a muted part in step 2235. The UE uses the muting control information to determine whether the muted part exists. If there is no muted part in the PRB, the UE performs a PDSCH reception operation in consideration of the muted part not existing in the allocated PRB in step 2250. Otherwise, if there is a muted part in the PRB at step 2235, the UE performs a PDSCH reception operation in consideration of the muted part existing in the allocated PRB in step 2240. That is, the UE performs receiving of signals under the assumption that no signal is received in the muted part. After processing the PDSCH at step 2240, the UE waits for the next subframe in step 2215. Also, after processing the PDSCH at step 2250, the UE waits for the next subframe in step 2220. If it is determined that the subframe is not supposed to be muted at step 2225, the UE determines whether the subframe carries a PDSCH destined for itself in step 2245. If the subframe carries the PDSCH at step 2245, the process proceeds to step 2250, otherwise the process proceeds to step 2220. If the subframe does not carry the PDSCH at step 2230, the process proceeds to step 2215.

Figure 26:
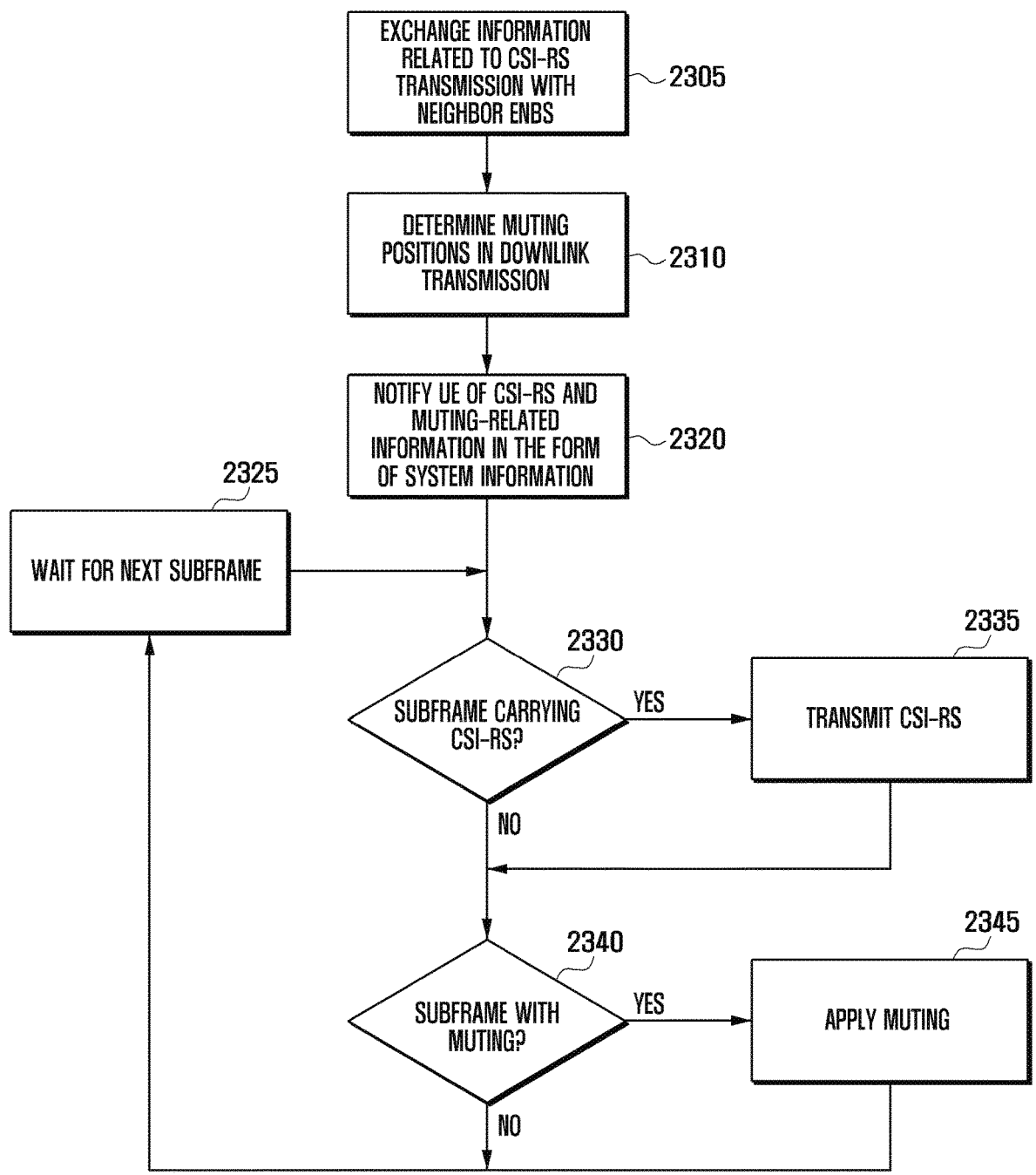
FIG. 26 is a diagram illustrating a method for an eNB to transmit CSI-RS with a muting scheme in a mobile communication system according to an exemplary embodiment of the present invention.

FIG. 26 is a diagram illustrating a method for an eNB to transmit CSI-RS with a muting scheme in a mobile communication system according to an exemplary embodiment of the present invention.

Referring to FIG. 26, an eNB exchanges information related to the transmission of CSI-RS with neighbor eNBs in step 2305. At step 2305, the eNBs coordinate the CSI-RS transmission per cell as well as exchange the information. Here, the coordination on the CSI-RS transmission refers to the distribution of the CSI-RS patterns defined as shown in FIGS. 9 and 11 to transmit the CSI-RSs. After the information exchange, the eNB determines muting positions in downlink transmission using the information related to the CSI-RS transmission in step 2310. That is, the eNB determines how to apply muting in detail by determining the muting interval, duration, and position in frequency domain. Next, the eNB transmits control information related to the CSI-RS and muting to the eNB in step 2320. At this time, the control information related to the CSI-RS and muting can be transmitted in the form of system information. After transmitting the information about the CSI-RS and muting, the eNB determines whether a current subframe is supposed to carry the CSI-RS in step 2330.

If the current subframe is supposed to carry the CSI-RS, the eNB transmits the CSI-RS in the current subframe in step 2335. Next, the eNB determines whether the current subframe is supposed to receive muting in step 2340 and, if the current subframe is supposed to take muting, performs downlink transmission of the subframe with muting in step 2345. That is, the eNBs share the CSI-RS patterns and number of CSI-RS antenna ports about adjacent cells. At the time to transmit its subframe, the eNB analyzes the CSI-RS pattern to determine whether the subframe is supposed to carry CSI-RS and, if the CSI-RS transmission time arrives, transmits the CSI-RS in the subframe based on the CSI-RS pattern. Also, if the CSI-RS transmission time of the adjacent cell arrives, the eNB performs muting on a number of REs corresponding to the number of CSI-RS antenna ports of the CSI-RS pattern of the adjacent cell. Thereafter, the eNB waits for the next subframe in step 2325, and when there is the next subframe, the process returns to step 2330. Accordingly, this operation repeats in every subframe.

Figure 27:
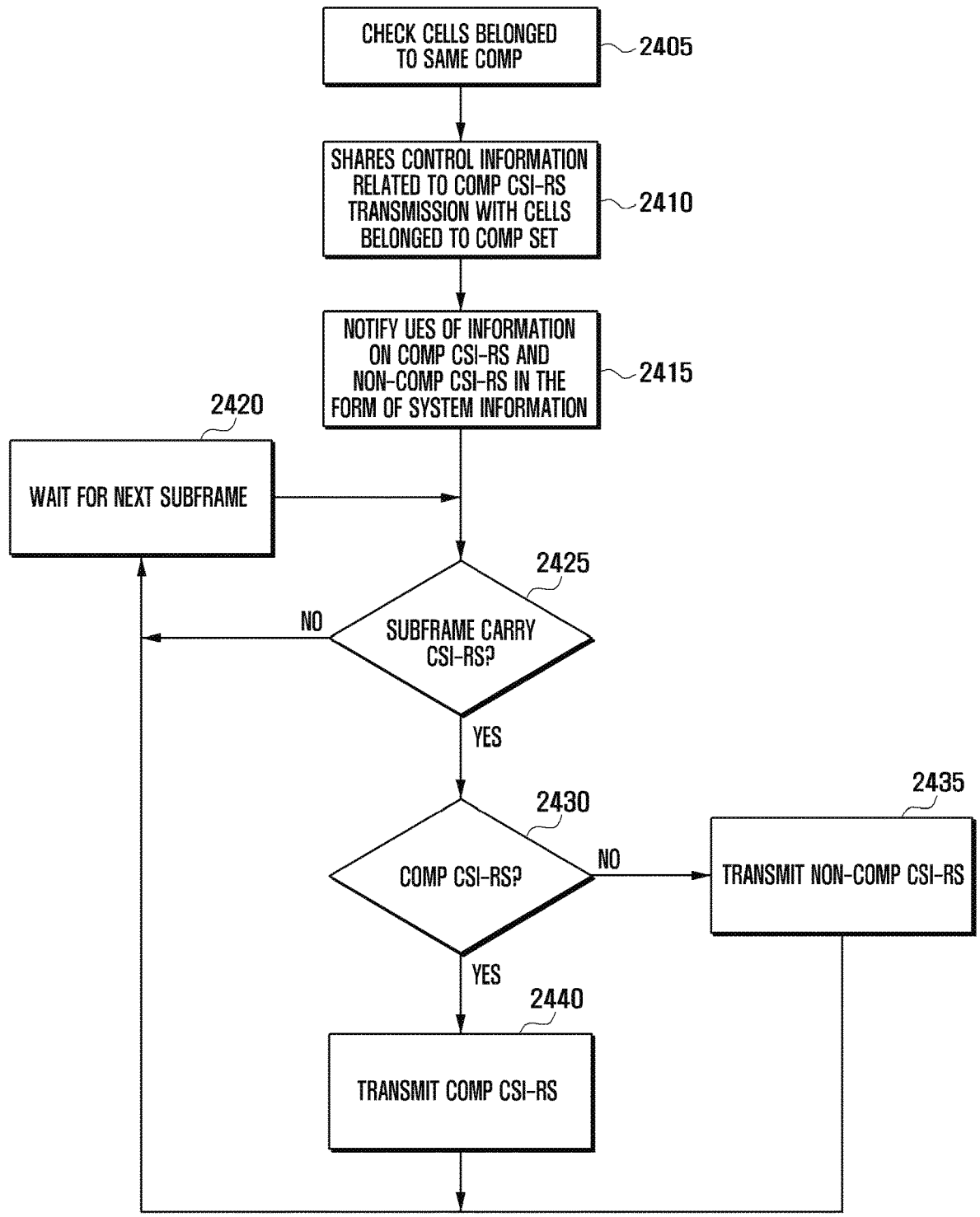
FIG. 27 is a diagram illustrating a method for an eNB to transmit non-CoMP CSI-RS and CoMP CSI-RS in a mobile communication according to an exemplary embodiment of the present invention.

FIG. 27 is a diagram illustrating a method for an eNB to transmit non-CoMP CSI-RS and CoMP CSI-RS in a mobile communication according to an exemplary embodiment of the present invention.

Referring to FIG. 27, the eNB determines the cells belonged to a CoMP set in step 2405. The CoMP set is a set of a plurality of cells involved in the CoMP transmission. After determining the cells participating in the CoMP, the eNB shares the control information related to the CoMP CSI-RS transmission with the cells belonged to the CoMP set in step 2410. In a case where the CoMP CSI-RS is transmitted as shown in FIG. 19, the shared information can include the CSI-RS patterns in which the CoMP CSI-RS of the cells are transmitted and antenna ports and scrambling to be used for transmission. Afterward, the eNB notifies the UEs of the information on the CoMP CSI-RS and non-CoMP CSI-RS in step 2415.

Next, the eNB determines whether the current subframe is supposed to carry the CSI-RS in step 2425. If the current subframe is supposed to carry the CSI-RS, the eNB determines whether the current subframe is supposed to carry the CoMP CSI-RS in step 2430. If the current subframe is supposed to carry the CoMP CSI-RS, the eNB transmits the CoMP CSI-RS in the subframe in step 2240 and, otherwise, the eNB transmits the non-CoMP CSI-RS in the subframe in step 2435. If the current subframe is not supposed to carry the CoMP CSI-RS at step 2425 and after transmitting the CSI-RS at step 2440 or 2435, the eNB proceeds to step 2420 to wait for the next subframe. Thereafter, the process returns to step 2425.

As described above, if the current subframe is supposed to carry CSI-RS, the eNB determines whether the CSI-RS to be transmitted is CoMP CSI-RS. At this time, if the current subframe is supposed to carry CoMP CSI-RS, the eNB transmits the CoMP CSI-RS and, otherwise, non-CoMP CSI-RS. Here, the CoMP CSI-RS is the CSI-RS transmitted by multiple cells for the UE to measure the downlink channels of the multiple cells, and the CoMP set is a set of the cells participated in the CoMP CSI-RS transmission. Here, the eNB transmits the CSI-RSs in the subframes positioned at a first time interval and, among the CSI-RSs, the CoMP CSI-RSs are transmitted in the subframes at a second time interval and the non-CoMP CSI-RSs are transmitted in the rest subframes at the first time interval, where the second time interval can be multiple of the first time interval. When transmitting the CSI-RS, it can be designed such that the non-CoMP CSI-RSs are transmitted in the subframes at the first time interval and the CoMP CSI-RSs are transmitted in the subframes at the second time interval, where the second time interval is multiple of the second time interval in length and the subframes carrying the non-CoMP CSI-RSs and CoMP CSI-RSs are not overlapped. Here, the CoMP CSI-RSs use a small number of the virtual antenna ports as compared to the non-CoMP CSI-RSs, and the first time interval can be equal to 5 subframes.

Figure 28:
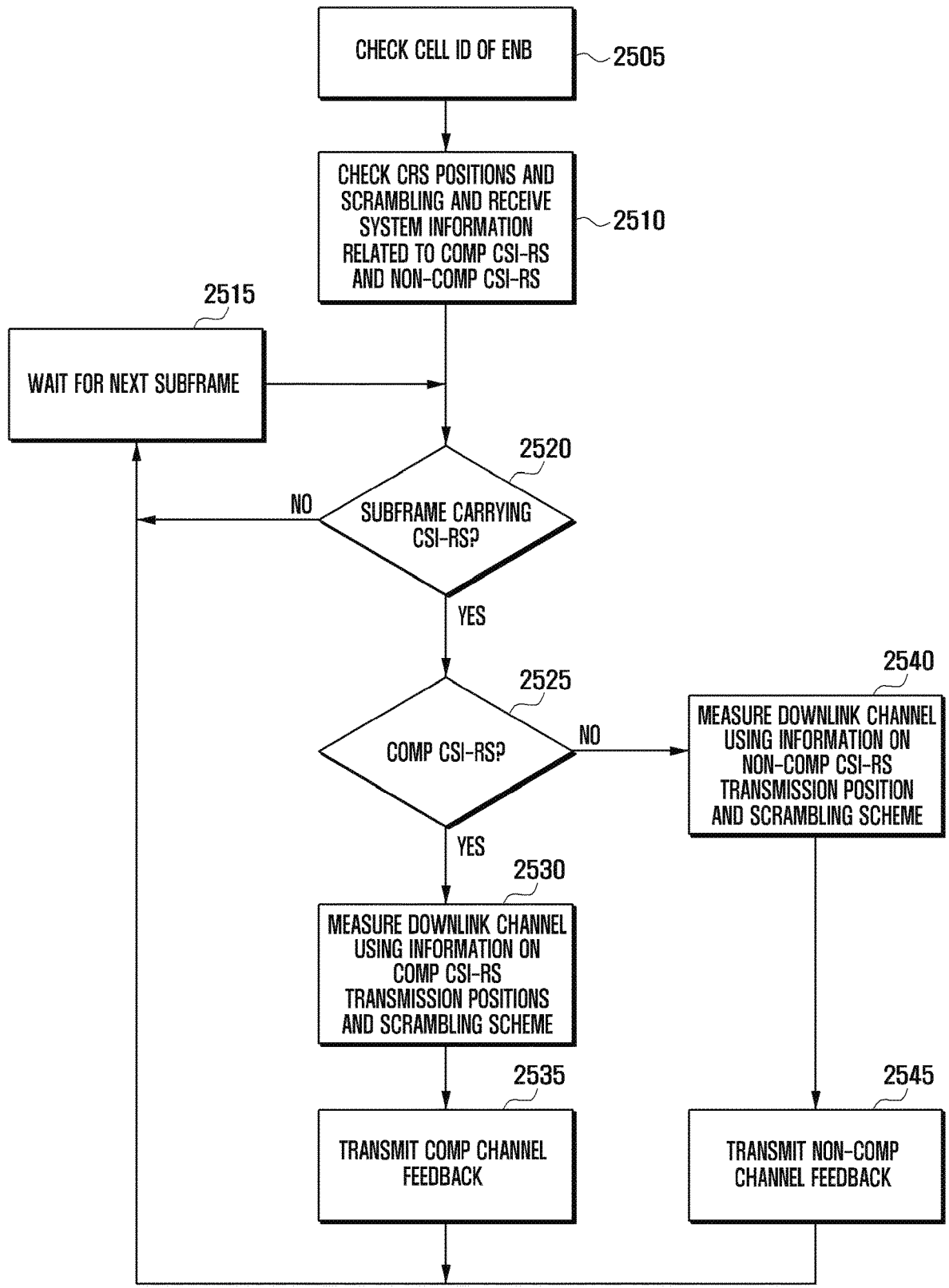
FIG. 28 is a flowchart illustrating a method for a UE to receive non-CoMP CSI-RS and CoMP CSI-RS in a mobile communication according to an exemplary embodiment of the present invention.

FIG. 28 is a flowchart illustrating a method for a UE to receive a non-CoMP CSI-RS and a CoMP CSI-RS in a mobile communication according to an exemplary embodiment of the present invention.

Referring to FIG. 28, the UE determines the cell ID of the eNB transmitting signals in the corresponding cell in step 2505. The cell ID is used to acquire the information on the CRS positions and scrambling, and the UE receives the system information of the corresponding cell based on the CRS information in step 2510. The UE determines the CRS position and scramble and then receives the information related to the CoMP CSI-RS and non-CoMP CSI-RS at step 2510. The system information of the corresponding cell includes the control information used for receiving the CoMP CSI-RS and non-CSI-RS. The UE determines, based on the CoMP CSI-RS and non-CoMP CSI-RS information acquired at step 2510, whether the current subframe carries a CSI-RS in step 2520. If the subframe carries a CSI-RS at step 2520, the UE determines whether the CSI-RS carried in the subframe is CoMP CSI-RS in step 2525. If the CSI-RS carried in the subframe is CoMP CSI-RS, the UE measures the CoMP channels based on the scrambling sequence and antenna ports of each cell in step 2530. Next, the UE generates the CoMP channel state information based on the measurement and reports the channel information to the eNB in step 2535. If the CSI-RS carried in the subframe is non-CoMP CSI-RS at step 2525, the UEs measures the channel state of the corresponding cell using the CSI-RS based on the CSI-RS pattern, antenna port, and scrambling information transmitted by the corresponding cell in step 2540. Next, the UE generates the channel state information based on the measurement and reports the channel state information to the eNB in 2545. If the current subframe is not supposed to carry a CSI-RS at step 2520 and after steps 2535 or 2545, the UE proceeds to step 2515 to wait for the next subframe. Thereafter, the process returns to step 2520. Accordingly, the UE repeats this operation for every subframe.

As described above, the method for processing CSI-RS according to an exemplary embodiment of the present invention is capable of transmitting the CSI-RSs of antenna ports alternately in different PRBs so as to manage transmission power of all antenna ports of an eNB efficiently. The method for processing CSI-RS according to an exemplary embodiment of the present invention assigns different CSI-RS patterns to the cells in order to avoid the transmission positions of the CSI-RSs of different cells, thereby suppressing signal interferences, transmitting non-CoMP CSI-RS and CoMP CSI-RS efficiently, and allowing the UE to measure a channel efficiently with the assistance of muting the resource on which a neighbor eNB transmits CSI-RS.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for wireless communication by a terminal, the method comprising:
   receiving, from a base station, first information related to a first channel state information reference signal (CSI-RS) and second information related to a second CSI-RS, the second information indicating a periodicity and offset for the second CSI-RS and a muting position of a resource element within a resource block;
   determining resource blocks in which a resource element is to be muted based on the periodicity and offset, the resource blocks being in one of even index resource blocks or odd index resource blocks; and
   receiving data based on the muting position in the resource blocks.

2. The method of claim 1, further comprising:
   determining resource blocks in which at least one first CSI-RS is transmitted based on the first information,
   wherein the at least one first CSI-RS is transmitted in in one of even index resource blocks or odd index resource blocks.

3. The method of claim 2, wherein the first CSI-RS is non-zero power CSI-RS and the second CSI-RS is zero-power CSI-RS.

4. The method of claim 1, wherein the first information includes a periodicity and offset related to the first CSI-RS.

5. A method for mobile communication by a base station, the method comprising:
   generating first information related to a first channel state information reference signal (CSI-RS) and second information related to a second CSI-RS, the second information indicating a periodicity and offset for the second CSI-RS and a muting position of a resource element within a resource block;

transmitting, to a terminal, the first information and the second information; and transmitting data based on the muting position in resource blocks in which a resource element to be muted, wherein the resource blocks is determined based on the periodicity and offset, wherein the resource blocks is in one of even index resource blocks or odd index resource blocks.

6. The method of claim 5, further comprising:

transmitting at least one first CSI-RS based on the first information, wherein the at least one first CSI-RS is transmitted in one of even index resource blocks or odd index resource blocks.

7. The method of claim 6, wherein the first CSI-RS is non-zero power CSI-RS and the second CSI-RS is zero-power CSI-RS.

8. The method of claim 5, wherein the first information includes a periodicity and offset related to the first CSI-RS.

9. A terminal for mobile communication, the terminal comprising:

a transceiver; and a controller configured to:

receive, from a base station, first information related to a first channel state information reference signal (CSI-RS) and second information related to a second CSI-RS, the second information indicating a periodicity and offset for the second CSI-RS and a muting position of a resource element within a resource block, determine resource blocks in which a resource element is to be muted based on the periodicity and offset, the resource blocks being in one of even index resource blocks or odd index resource blocks, and receive data based on the muting position in the resource block.

10. The terminal of claim 9, wherein the controller is configured to:

determine resource blocks in which at least one first CSI-RS is transmitted based on the first information, wherein the at least one first CSI-RS is transmitted in in one of even index resource blocks or odd index resource blocks.

11. The terminal of claim 10, wherein the first CSI-RS is non-zero power CSI-RS and the second CSI-RS is zero-power CSI-RS.

12. The terminal of claim 9, wherein the first information includes a periodicity and offset related to the first CSI-RS.

13. A base station for mobile communication, the base station comprising:

a transceiver; and a controller configured to:

generate first information related to a first channel state information reference signal (CSI-RS) and second information related to a second CSI-RS, the second information indicating a periodicity and offset for the second CSI-RS and a muting position of a resource element within a resource block, transmit, to a terminal, the first information and the second information, and transmit data based on the muting position in resource blocks in which a resource element to be muted, wherein the resource blocks is determined based on the periodicity and offset, and wherein the resource blocks is in one of even index resource blocks or odd index resource blocks.

14. The base station of claim 13, wherein the controller is configured to transmit at least one first CSI-RS based on the first information, and wherein the at least one first CSI-RS is transmitted in one of even index resource blocks or odd index resource blocks.

15. The base station of claim 14, wherein the first CSI-RS is non-zero power CSI-RS and the second CSI-RS is zero-power CSI-RS.

16. The base station of claim 13, wherein the first information includes a periodicity and offset related to the first CSI-RS.

* * * * *